Feb. 14, 1967 C. H. CLARK ET AL 3,304,366

COMMUNICATIONS EQUIPMENT PRINTER

Original Filed April 3, 1962 21 Sheets-Sheet 1

INVENTORS
CLAYTON H. CLARK
DONALD J. STEFANIK

BY Strauch, Nolan, Neale, Nies & Brownaugh
ATTORNEYS

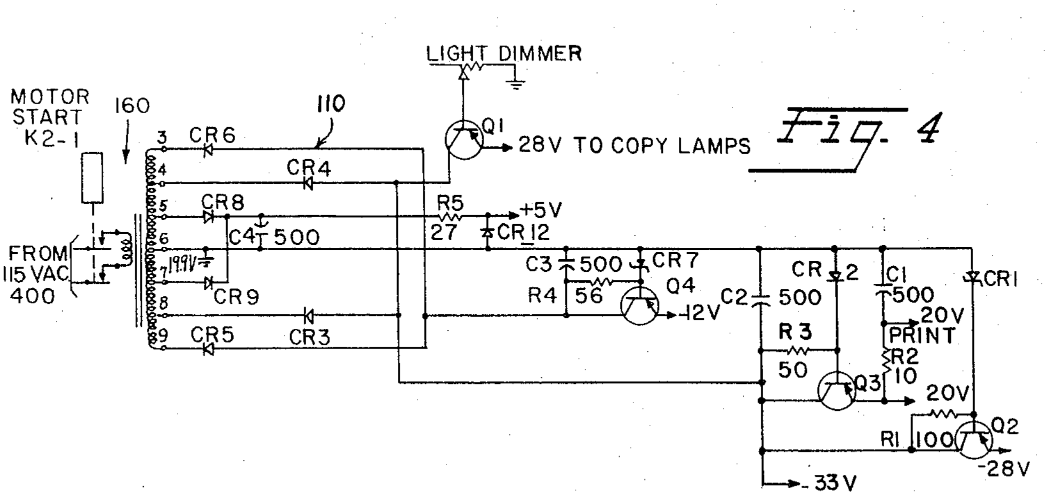

Fig. 4

| START STOP MACHINE ALPHABET | | | | | | | | | |
|---|---|---|---|---|---|---|---|---|---|
| COMMUNICATION & WEATHER LETTERS | COMMUNI-CATIONS FIGURES | WEATHER FIGURES | NUMBER OF IMPULSES | | | | | | |
| | | | START | 1 | 2 | 3 | 4 | 5 | STOP |
| A | — | ↑ | | ▨ | ▨ | | | | ▨ |
| B | ? | ⊕ | | ▨ | | | ▨ | ▨ | ▨ |
| C | : | O | | | ▨ | ▨ | ▨ | | ▨ |
| D | $ | ↗ | | ▨ | | | ▨ | | ▨ |
| E | 3 | 3 | | ▨ | | | | | ▨ |
| F | ! | → | | ▨ | | ▨ | ▨ | | ▨ |
| G | & | ↘ | | | ▨ | | ▨ | ▨ | ▨ |
| H | # | ↓ | | | | ▨ | | ▨ | ▨ |
| I | 8 | 8 | | | ▨ | ▨ | | | ▨ |
| J | ' | ↙ | | ▨ | ▨ | | ▨ | | ▨ |
| K | ( | ← | | ▨ | ▨ | ▨ | ▨ | | ▨ |
| L | ) | ↖ | | | ▨ | | | ▨ | ▨ |
| M | . | . | | | | ▨ | ▨ | ▨ | ▨ |
| N | , | ⦶ | | | | ▨ | ▨ | | ▨ |
| O | 9 | 9 | | | | | ▨ | ▨ | ▨ |
| P | Ø | Ø | | | ▨ | ▨ | | ▨ | ▨ |
| Q | 1 | 1 | | ▨ | ▨ | ▨ | | ▨ | ▨ |
| R | 4 | 4 | | | ▨ | | ▨ | | ▨ |
| S | BELL | BELL | | ▨ | | ▨ | | | ▨ |
| T | 5 | 5 | | | | | | ▨ | ▨ |
| U | 7 | 7 | | ▨ | ▨ | ▨ | | | ▨ |
| V | ; | ⦵ | | | ▨ | ▨ | ▨ | ▨ | ▨ |
| W | 2 | 2 | | ▨ | ▨ | | | ▨ | ▨ |
| X | / | / | | ▨ | | ▨ | ▨ | ▨ | ▨ |
| Y | 6 | 6 | | ▨ | | ▨ | | ▨ | ▨ |
| Z | " | + | | ▨ | | | | ▨ | ▨ |
| BLANK | — | — | | | | | | | ▨ |
| LINE FEED | | | | | ▨ | | | | ▨ |
| LETTERS | | | | ▨ | ▨ | ▨ | ▨ | ▨ | ▨ |
| FIGURES | | | | ▨ | ▨ | | ▨ | ▨ | ▨ |
| SPACE | | | | | | ▨ | | | ▨ |
| CARRIAGE RETURN | | | | | | | ▨ | | ▨ |

NOTE: ▨ = MARKING SIGNAL
☐ = SPACING SIGNAL

Fig. 2

INVENTORS
CLAYTON H. CLARK
DONALD J. STEFANIK
BY Strauch, Nolan, Neale, Nies & Bronaugh
ATTORNEYS

COMMUNICATIONS EQUIPMENT PRINTER

Original Filed April 3, 1962 21 Sheets-Sheet 3

INVENTORS
CLAYTON H. CLARK
DONALD J. STEFANIK
BY Strauch, Nolan, Neale, Nies & Brounaugh
ATTORNEYS INVENTORS
CLAYTON H. CLARK
DONALD J. STEFANIK
BY Strauch, Nolan, Neale, Nies & Brownigh
ATTORNEYS COMPONENTS NOT ON MODE PANEL ARE SHOWN FOR REFERENCE ONLY.
MODE PANEL RELAY COILS ARE 500 OHMS.
P/O INDICATES "PART OF"

INVENTORS
CLAYTON H. CLARK
DONALD J. STEFANIK

BY Strauch, Nolan, Neale, Nies & Brounaugh
ATTORNEYS

INVENTORS
CLAYTON H. CLARK
DONALD J. STEFANIK
BY Strauch, Nolan, Neale, Nies & Brosnaugh
ATTORNEYS

COMMUNICATIONS EQUIPMENT PRINTER

Original Filed April 3, 1962

INVENTORS
CLAYTON H. CLARK
DONALD J. STEFANIK
BY Strauch, Nolan, Neale Nies & Bronaugh
ATTORNEYS Feb. 14, 1967 C. H. CLARK ET AL 3,304,366

COMMUNICATIONS EQUIPMENT PRINTER

Original Filed April 3, 1962 21 Sheets-Sheet 8

INVENTORS
CLAYTON H. CLARK
DONALD J. STEFANIK

BY Strauch, Nolan, Neale, Nies & Bronaugh
ATTORNEYS

INVENTORS
CLAYTON H. CLARK
DONALD J. STEFANIK

BY Strauch, Nolan, Neale, Nies & Brounaugh
ATTORNEYS

INVENTORS
CLAYTON H. CLARK
DONALD J. STEFANIK
BY Strauch, Nolan, Neale, Nies & Bronaugh
ATTORNEYS

| ↑ | ↓ | BAUDOT 54321 | BINARY POSITION | COUNT SET INTO COUNTR |
|---|---|---|---|---|
| 3 | E | 00001 | 2 | (14) |
| - | A | 00011 | 4 | (12) |
| BELL | S | 00101 | 6 | (10) |
| 8 | I | 00110 | 7 | (9) |
| 7 | U | 00111 | 8 | (8) |
| $ | D | 01001 | 10 | (6) |
| 4 | R | 01010 | 11 | (5) |
| ' | J | 01011 | 12 | (4) |
| , | N | 01100 | 13 | (3) |
| ! | F | 01101 | 14 | (2) |
| : | C | 01110 | 15 | (1) |
| ( | K | 01111 | 16 | (0) |
| 5 | T | 10000 | 17 | (31) |
| " | Z | 10001 | 18 | (30) |
| ) | L | 10010 | 19 | (29) |
| 2 | W | 10011 | 20 | (28) |
| # | H | 10100 | 21 | (27) |

| ↑ | ↓ | BAUDOT 54321 | BINARY POSITION | COUNT SET INTO COUNTER |
|---|---|---|---|---|
| 6 | Y | 10101 | 22 | (26) |
| Ø | P | 10110 | 23 | (25) |
| 1 | Q | 10111 | 24 | (24) |
| 9 | O | 11000 | 25 | (23) |
| ? | B | 11001 | 26 | (22) |
| & | G | 11010 | 27 | (21) |
| - | M | 11100 | 29 | (19) |
| / | X | 11101 | 30 | (18) |
| ; | V | 11110 | 31 | (17) |
| | FIGS. | 11011 | 28 | (20) |
| | LTRS. | 11111 | 32 | (16) |
| | SPACE | 00100 | 5 | (11) |
| | CAR.RET. | 01000 | 9 | (7) |
| | LINE FEED | 00010 | 3 | (13) |
| | BLANK | 00000 | 1 | (15) |

INVENTORS
CLAYTON H. CLARK
DONALD J. STEFANIK
BY Strauch, Nolan, Neale, Nies & Bronaugh
ATTORNEYS Feb. 14, 1967 C. H. CLARK ET AL 3,304,366

COMMUNICATIONS EQUIPMENT PRINTER

Original Filed April 3, 1962 21 Sheets-Sheet 12

INVENTORS
CLAYTON H. CLARK
DONALD J. STEFANIK

BY Strauch, Nolan, Neale, Nies & Bronaugh
ATTORNEYS

Feb. 14, 1967 C. H. CLARK ET AL 3,304,366

COMMUNICATIONS EQUIPMENT PRINTER

Original Filed April 3, 1962 21 Sheets-Sheet 13

INVENTORS
CLAYTON H. CLARK
DONALD J. STEFANIK

BY Strauch, Nolan, Neale, Nies & Bronaugh
ATTORNEYS

Feb. 14, 1967 C. H. CLARK ET AL 3,304,366

COMMUNICATIONS EQUIPMENT PRINTER

Original Filed April 3, 1962 21 Sheets-Sheet 14

INVENTORS
CLAYTON H. CLARK
DONALD J. STEFANIK

BY Strauch, Nolan, Neale, Nies & Brouaugh
ATTORNEYS

INVENTORS
CLAYTON H. CLARK
DONALD J. STEFANIK

BY Strauch, Nolan, Neale, Nies & Bronaugh
ATTORNEYS

INVENTORS
CLAYTON H. CLARK
DONALD J. STEFANIK

BY Strauch, Nolan, Neale, Nies & Brouaugh
ATTORNEYS

Feb. 14, 1967 C. H. CLARK ET AL 3,304,366

COMMUNICATIONS EQUIPMENT PRINTER

Original Filed April 3, 1962 21 Sheets-Sheet 17

INVENTORS
CLAYTON H. CLARK
DONALD J. STEFANIK

BY Strauch, Nolan, Neale, Nies & Bronaugh
ATTORNEYS

COMMUNICATIONS EQUIPMENT PRINTER

Original Filed April 3, 1962

INVENTORS
CLAYTON H. CLARK
DONALD J. STEFANIK
BY Strauch, Nolan, Neale, Nies & Bronaugh
ATTORNEYS

INVENTORS
CLAYTON H. CLARK
DONALD J. STEFANIK

BY Strauch, Nolan, Neale, Nies & Brouaugh
ATTORNEYS

INVENTORS
CLAYTON H. CLARK
DONALD J. STEFANIK
BY Strauch, Nolan, Neale, Nies & Bronaugh
ATTORNEYS

COMMUNICATIONS EQUIPMENT PRINTER

Original Filed April 3, 1962 21 Sheets-Sheet 21

INVENTORS
CLAYTON H. CLARK
DONALD J. STEFANIK

BY Strauch, Nolan, Neale, Nies & Bronaugh
ATTORNEYS 3,304,366
COMMUNICATIONS EQUIPMENT PRINTER
Clayton H. Clark, Mundelein, and Donald J. Stefanik, Berwyn, Ill., assignors to SCM Corporation, New York, N.Y., a corporation of New York
Original application Apr. 3, 1962, Ser. No. 184,820. Divided and this application Aug. 23, 1965, Ser. No. 481,795
26 Claims. (Cl. 178—23)

This invention relates to a communications equipment printer primarily intended for use in telegraphic communication, although it may be adapted for use with other data processing applications. It particularly relates to a drum type printer. This application is a division of co-pending application Serial No. 184,820, filed April 3, 1962.

The inventive equipment is versatile, compact and reliable and to this end various new concepts of mechanism and operation are incorporated in a drum type continuously rotating page printer incorporating many novel subcomponents such as specific relatively inexpensive drum construction, paper feed mechanism and the print hammer carriage mechanism with its feed and carriage return mechanisms, as well as some conventional subcomponents such as the ribbon feed and reverse mechanisms; and various electronics controls.

A primary object of this invention resides in the provision of a novel drum printer construction.

A further object resides in the provision of a novel continuously rotating drum printer including a rotating drum assembled from a plurality of rings of type to provide lines of identical type faces extending from a start-of-line position to an end-of-line position on a page, each ring being of novel lightweight construction and maintained in accurate indexed assembly by means of clamping end plates and the frictional engagement between the peripheries of each adjacent ring.

In conjunction with the preceding object, still another object resides in providing the rings of type on the peripheral flanges of type wheels, each of which has identical dual rows of all desired characters-to-be-printed on the printer and with the center lines of axially aligned, identical characters accurately spaced apart a predetermined distance and also accurately spaced from the adjacent edges of the peripheral flange one-half of that predetermined distance and the axial width of the wheel peripheral flange being maintained to extremely minute tolerances.

Still another object resides in the provision in a drum printer of novel drum subassembly and end bearing mounting structure coordinating with a novel record medium feed roller mechanism to provide line feed of the record medium.

In conjunction with the preceding object, it is a further object to provide a type drum mounted on an axle, a drum bearing retainer assembly disposed over each end of the axle, a record medium feed wheel and feed wheel gear assembly rotatably journalled on each retainer assembly adjacent the ends of the type drum, and a drum drive gear secured to one end of the drum shaft, each bearing retainer being secured in fixed assembly to the printer frame. In this connection, a further object resides in providing a clock head mounting plate on one of the bearing retainers, a drum position clock wheel secured to the drum shaft adjacent the clock head mounting plate and clock head means on the plate capable of being inductively pulsed by conjoint rotation of the type drum and the clock wheel to provide electronic coincidence signals indicative of the type character angular positions within a 360° angle of rotation of the type drum.

In conjunction with the foregoing object, it is a still further object to provide electronic means, in electronic circuit connection to the clock head means, to determine which one of several sectors of rotation of the type drum is rotating its characters past a print station.

A further object resides in providing a novel drum printer with a print hammer carriage movable in spacing steps from left to right in front of the drum, operated by electronic circuitry providing coincidence between a code signal received and impulse signals from drum rotations for causing the print hammer to strike the drum once per revolution of the drum for each character to be printed and to thereafter space one step across the page. In conjunction with the preceding object another object is to provide novel print hammer carriage mounted escapement spacing mechanism cooperating with a toothed rack and controlled by a solenoid operated bail.

Still another object resides in providing a page printer with a character spacing print hammer carriage, the carriage mounting a spacing escapement device engaging with a toothed rack and controlled by a solenoid operated bail, the toothed rack being shiftable away from the escapement and constituting part of the carriage return mechanism.

A still further object resides in providing a print hammer carriage step spaced under spring power on a type wheel page printer with a positive drive carriage return mechanism having linkage cocked by an energized solenoid and thereafter sequentially automatically accomplishing a shift and latching of the space escapement rack, carriage return to start-of-line position, winding of the spacing spring, carriage latching in start-of-line position exclusive of space escapement operation, unlatching the space escapement rack and releasing positive carriage return drive. In conjunction with this object a further object resides in providing a novel combination friction and position clutch structure between the printer motor and a carriage drive member. Another object resides in providing a carriage return stop damping device operated by unlatching linkage. Still another object resides in provision of mechanical enabling, in lieu of a normal spacing operation, an auxiliary operation of carriage unlatching upon the initial actuation of the spacing mechanism after the carriage has been latched in start-of-line position.

In conjunction with the preceding main object it is a further object to incorporate a novel form of electronic control of the printing mechanism assuring that no print operation will occur during the carriage return movement yet at the same time preventing loss of any such character which is received into the electronics control equipment.

A still further object resides in the provision, in a drum printer, of novel printer electronics which receive multiple serial information bits on an incoming line and channel the bits into a first register which registers such bits in parallel form, determines whether such registered bits call for printing of a character or a machine function, determines, if a machine function is called for, what the machine function is, shifts the multiple bit information into a second set of registers to make room for receiving the next following character while the first character is being printed or while the represented machine function is being performed, shifts the multiple bits from the second register into a third register to provide storage for two additional characters (three altogether) during an automatic carriage return period, controls ribbon lifting so that the ribbon will invariably be in raised position before the print solenoid is energized and, under coincidence control of position pulses derived from print drum rotation, determines when the character corresponding to the registered pulse is about to pass the print hammer, thus controlling energization of the print solenoid, controlling the subsequent operation of spacing mechanism after a character is printed, and providing control for the operation of the carriage return and line feed mechanisms.

A still further object resides in the provision of a novel, simple ribbon lift mechanism for a rotary drum page printer enabling parallel lift of a stretch of ribbon, at least the length of a line of type, across the record medium.

Other objects and novel aspects of the drum printer and its components will become apparent in conjunction with the description and the appended claims.

FIGURE 2 is a chart which illustrates the standard weather and communication symbols corresponding to a five unit Baudot code;

FIGURE 4 is a simplified schematic of a power supply circuit, one of which is included with each of Units 1 and 2 in a set;

Figure 7:
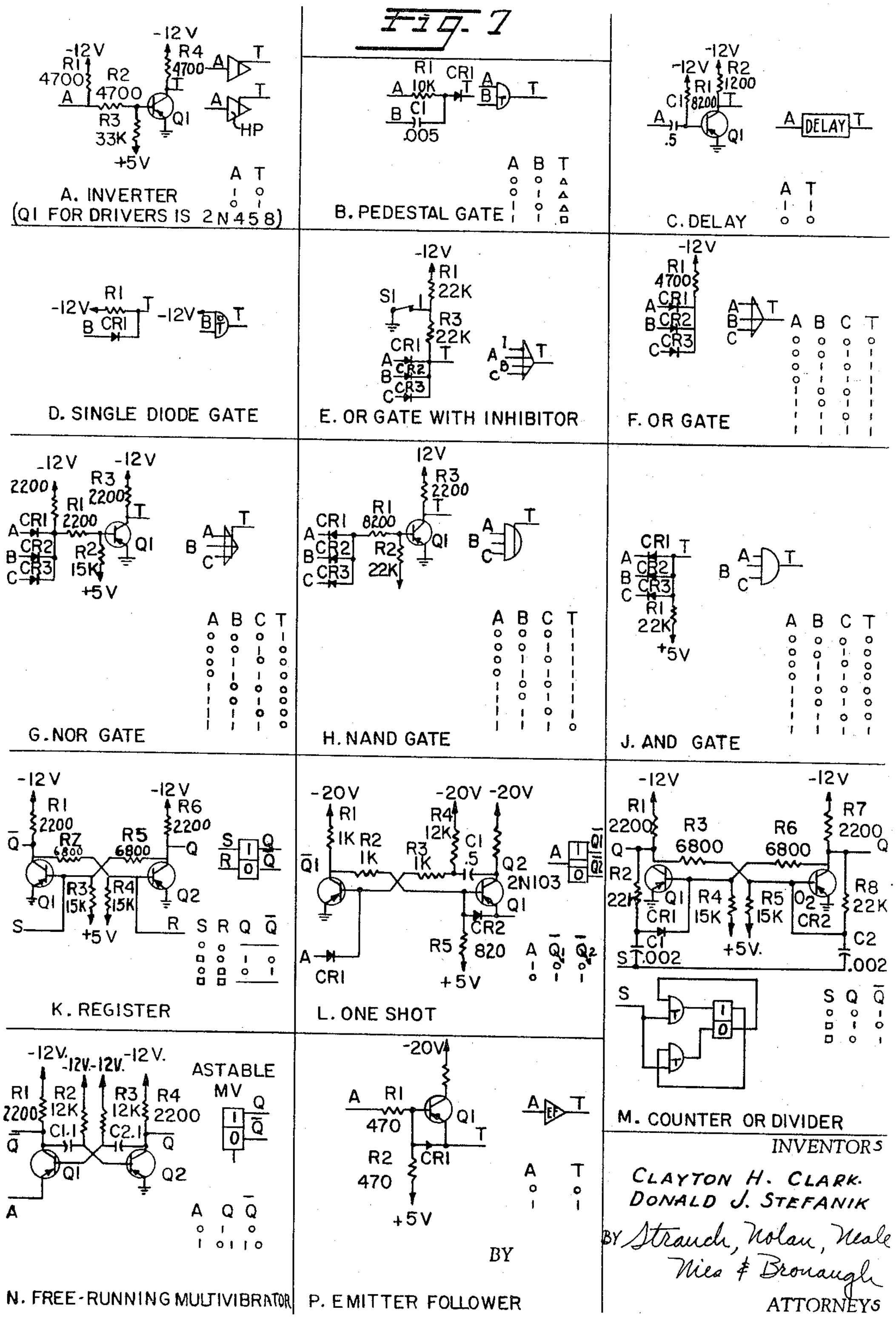
Figure 8A:
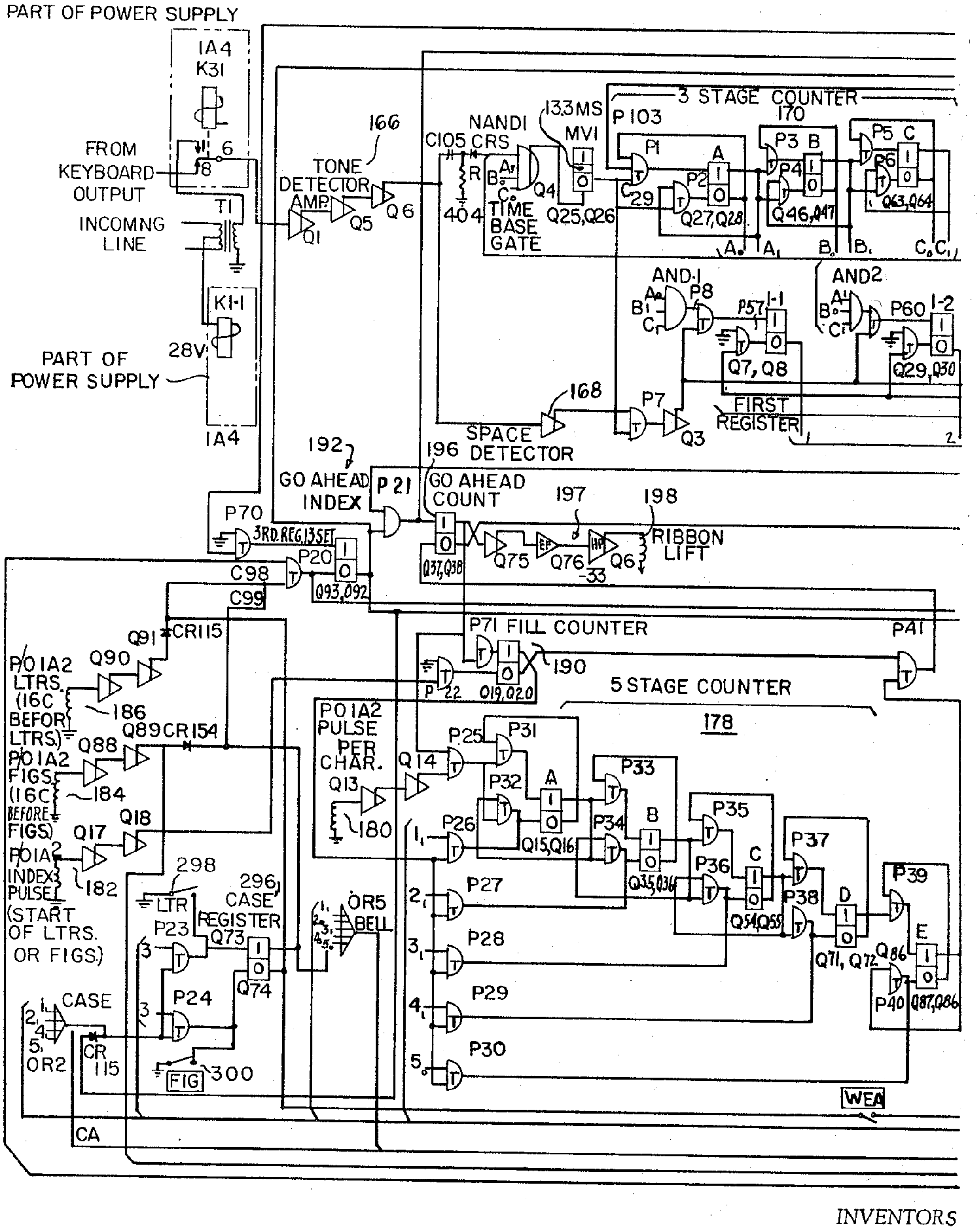
Figure 8B:
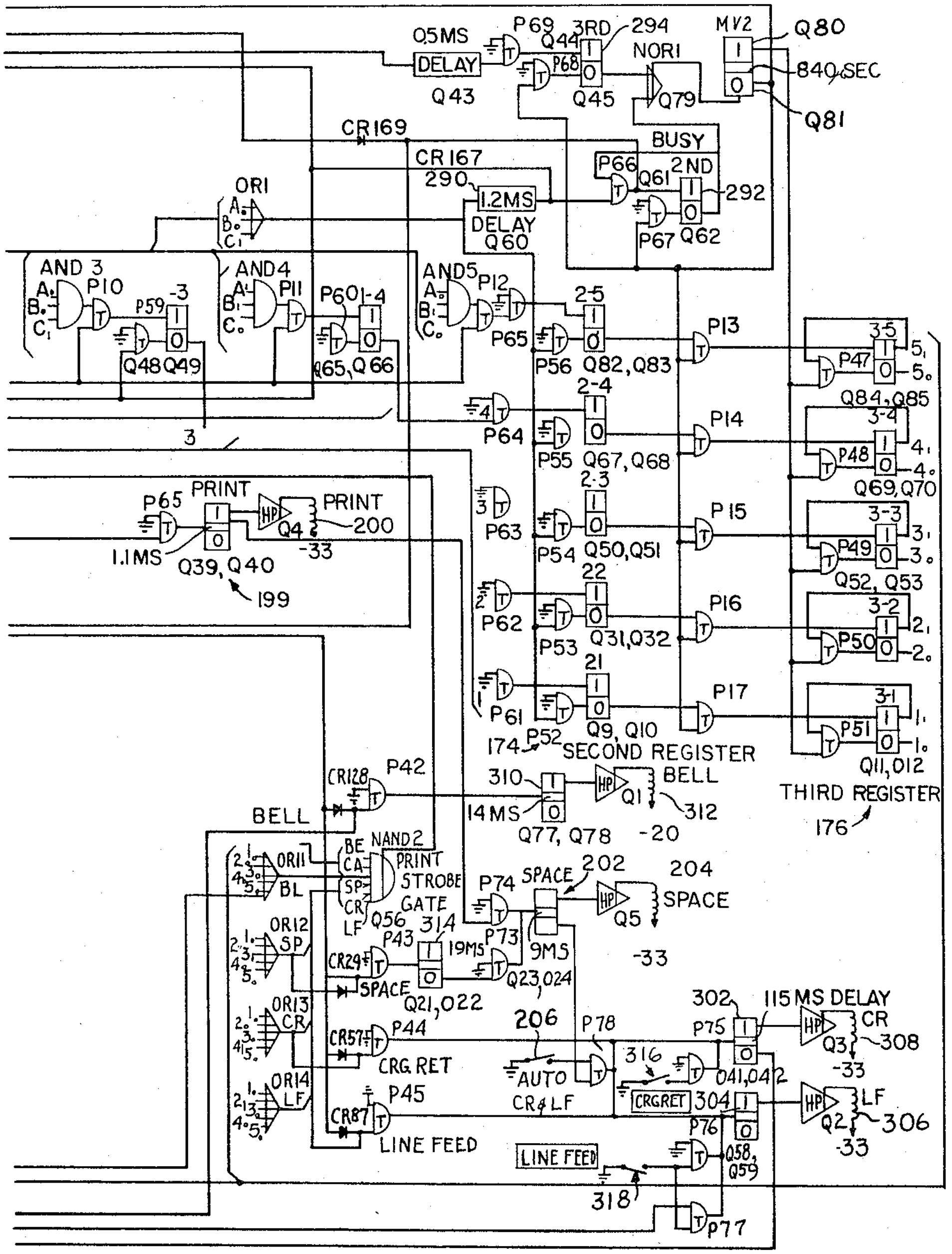
Figure 9:
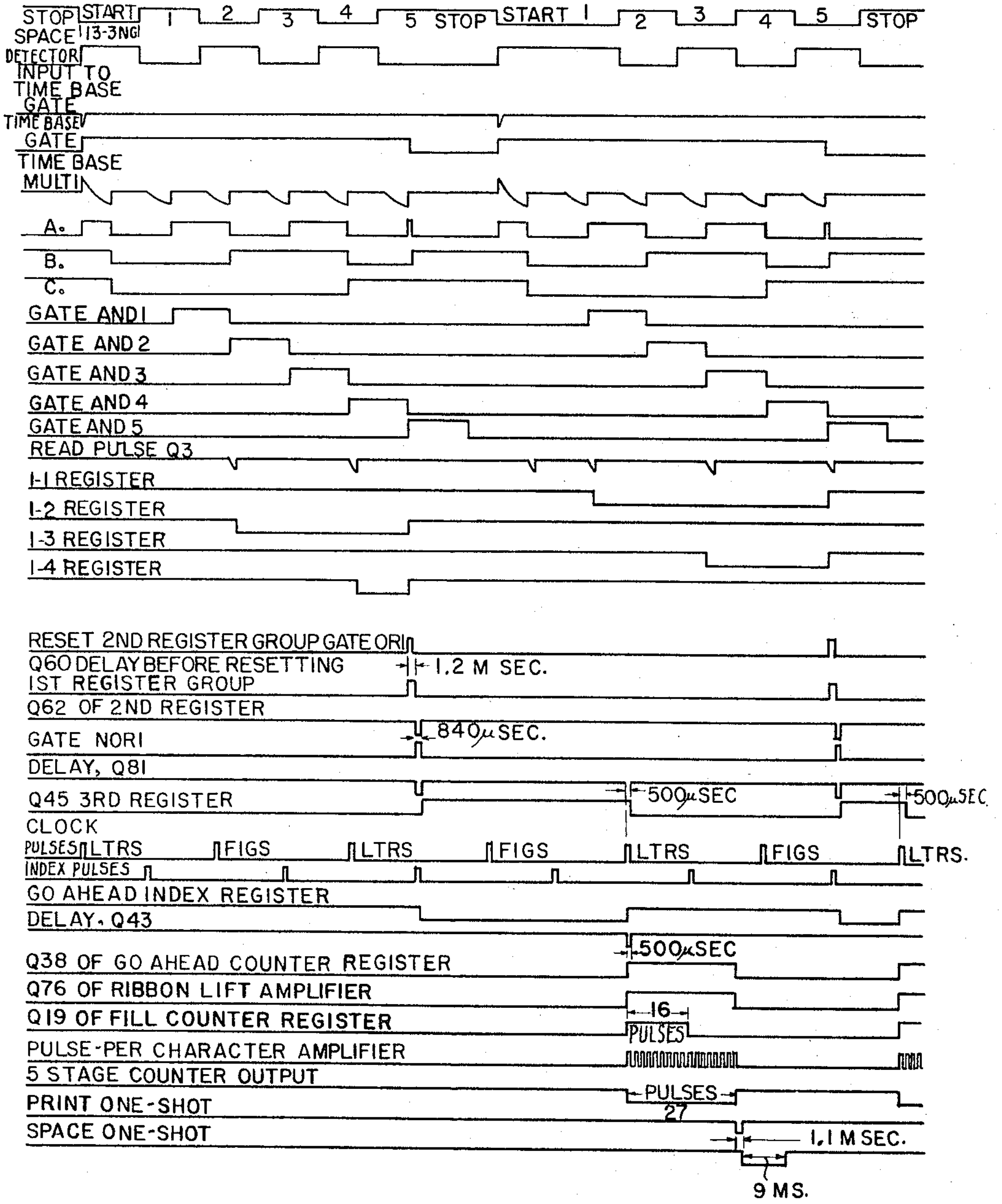
Figure 10:
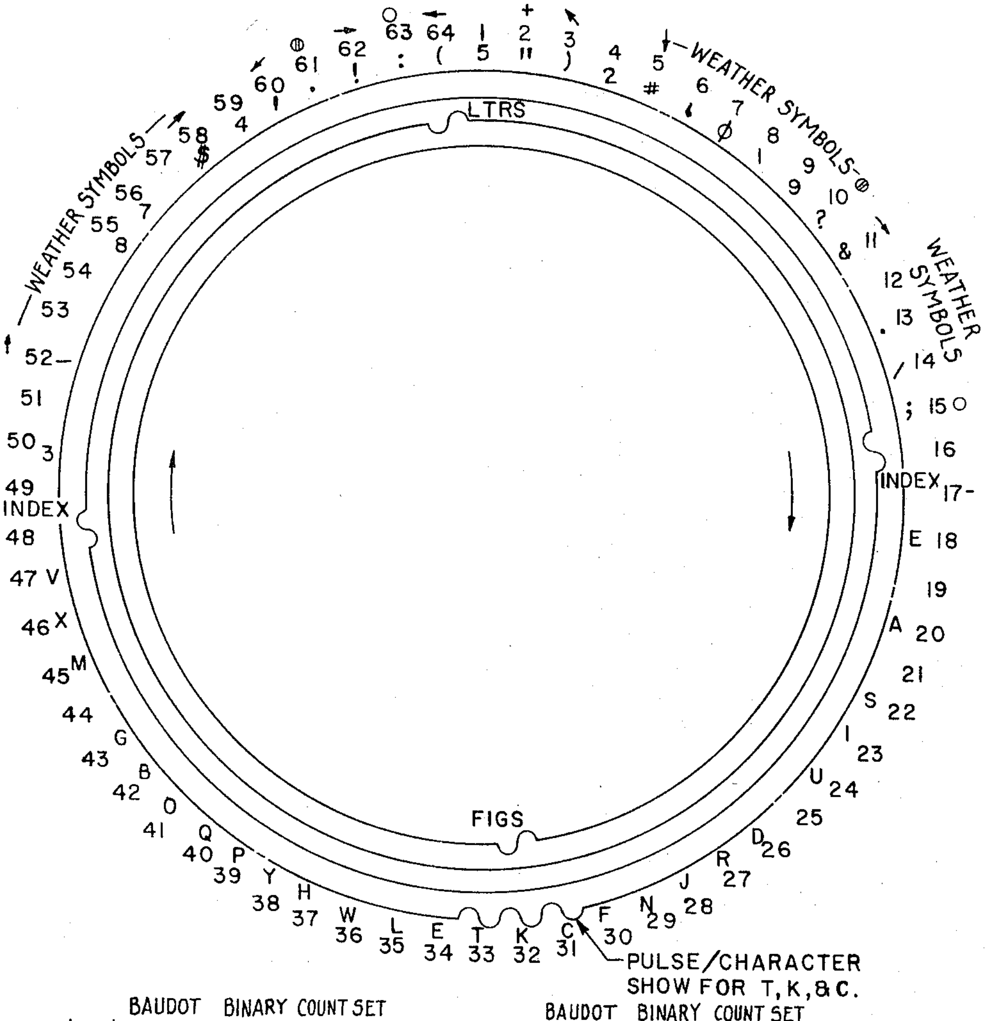
Figure 11:
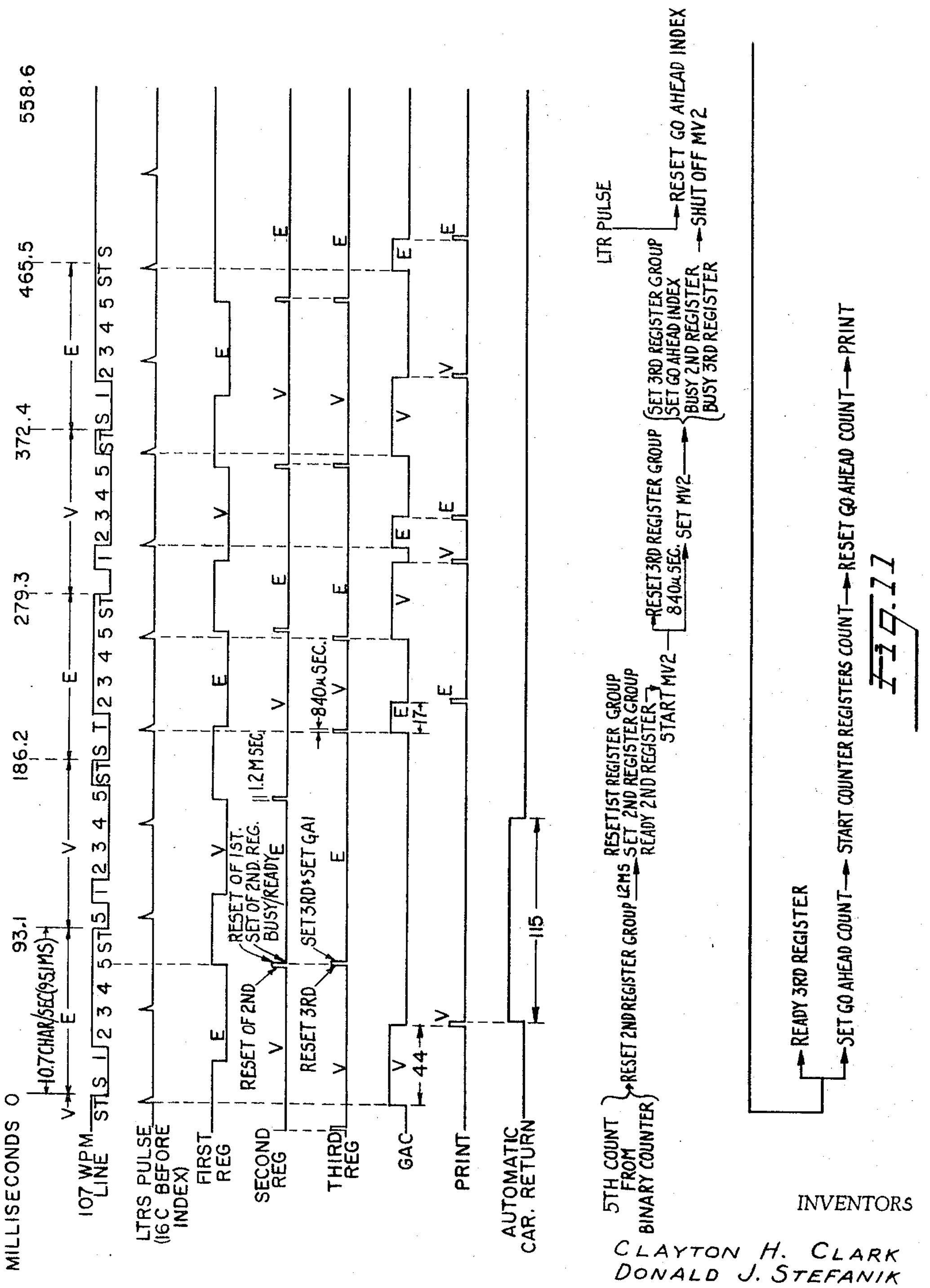
Figures 12, 15:
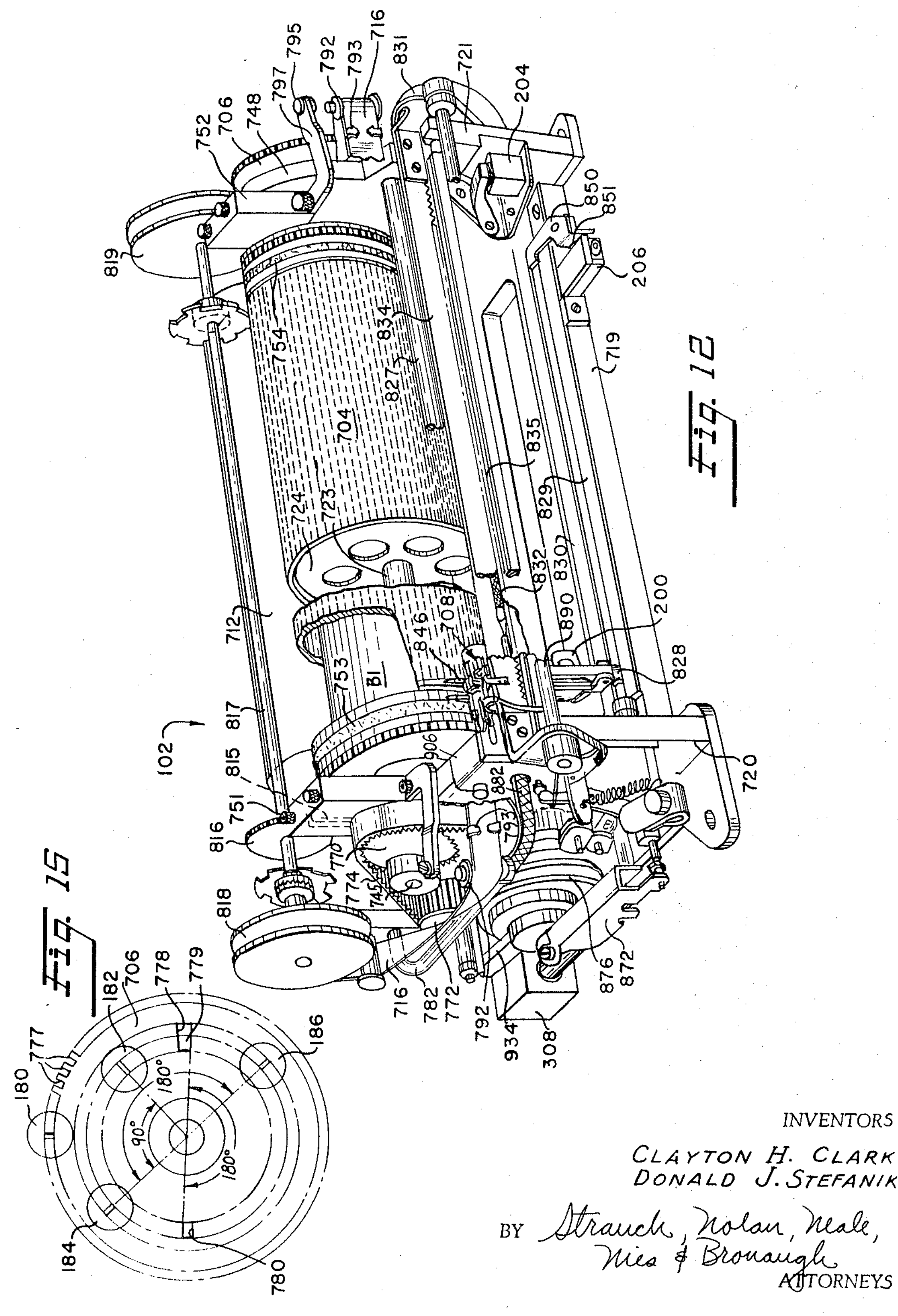
Figure 13:
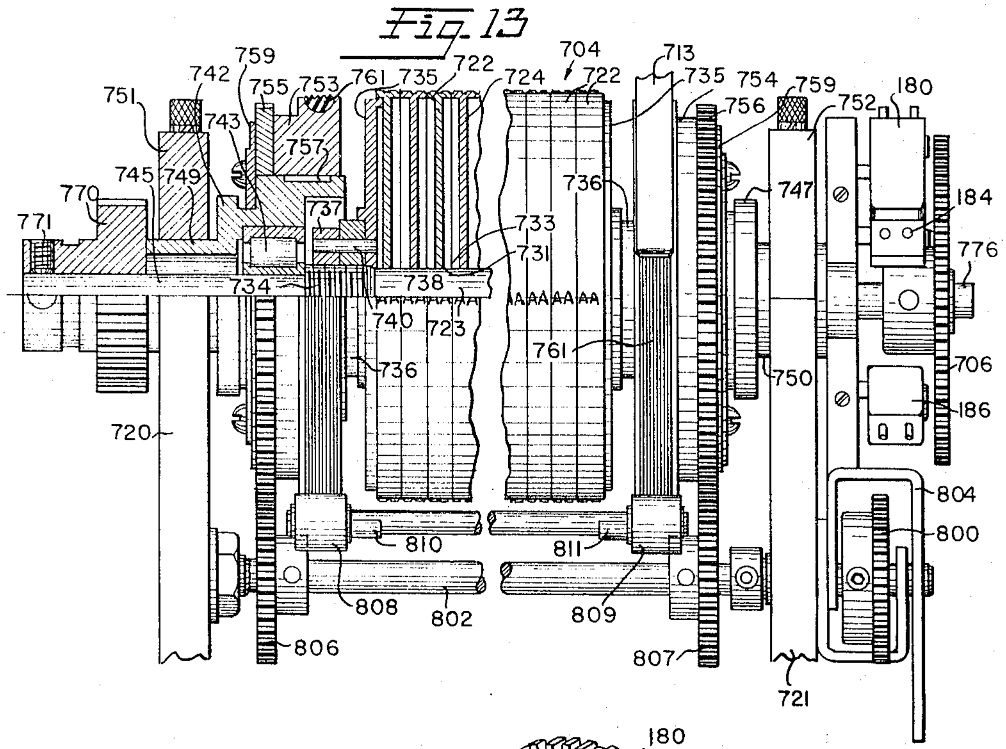
Figure 14:
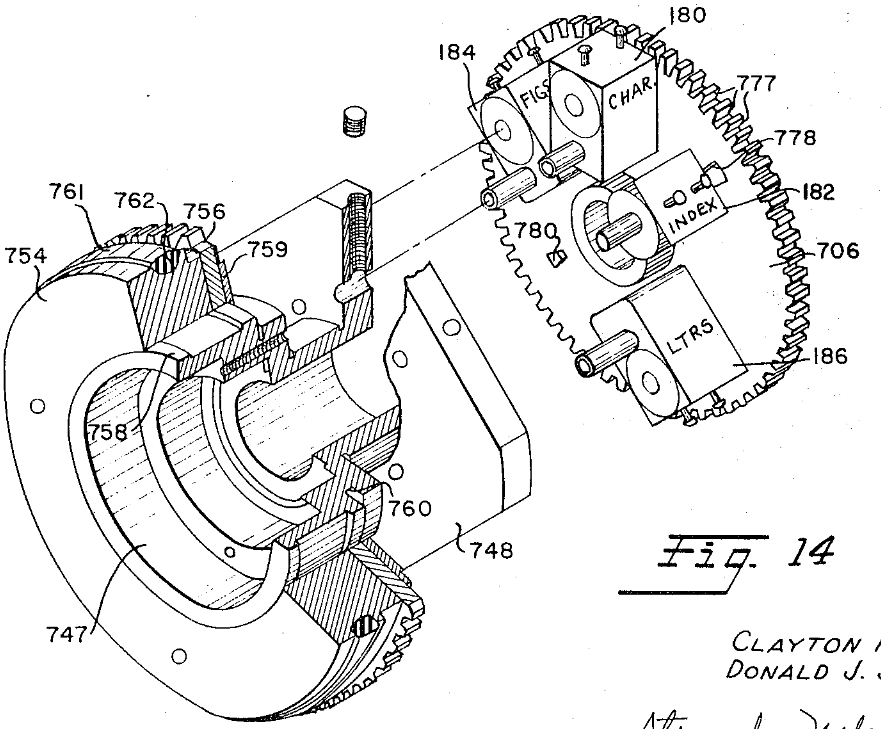
Figure 16:
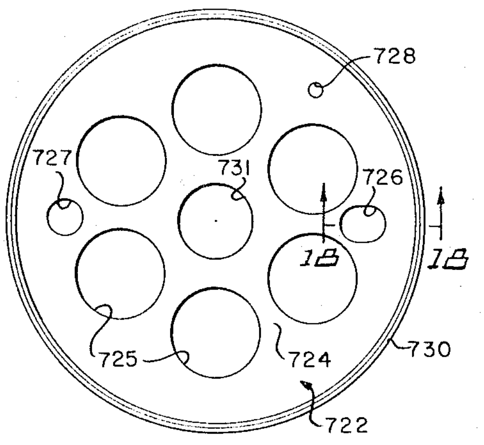
Figure 17:
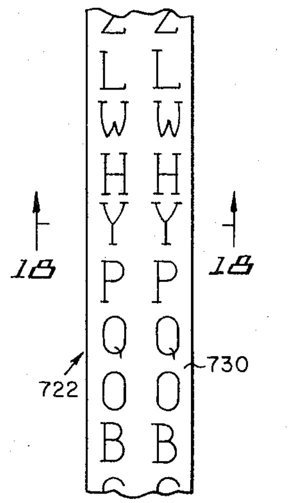
Figure 19:
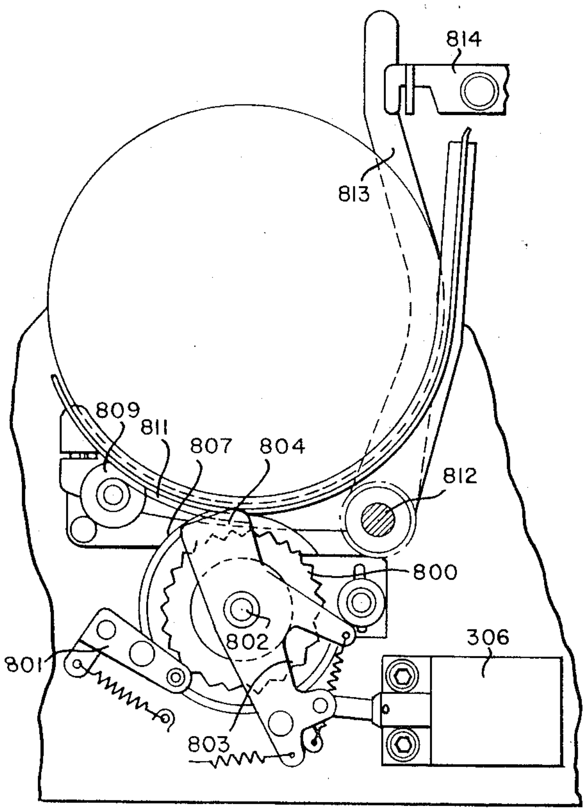
Figure 18:
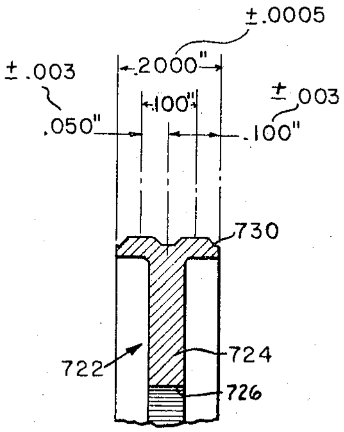
Figure 20:
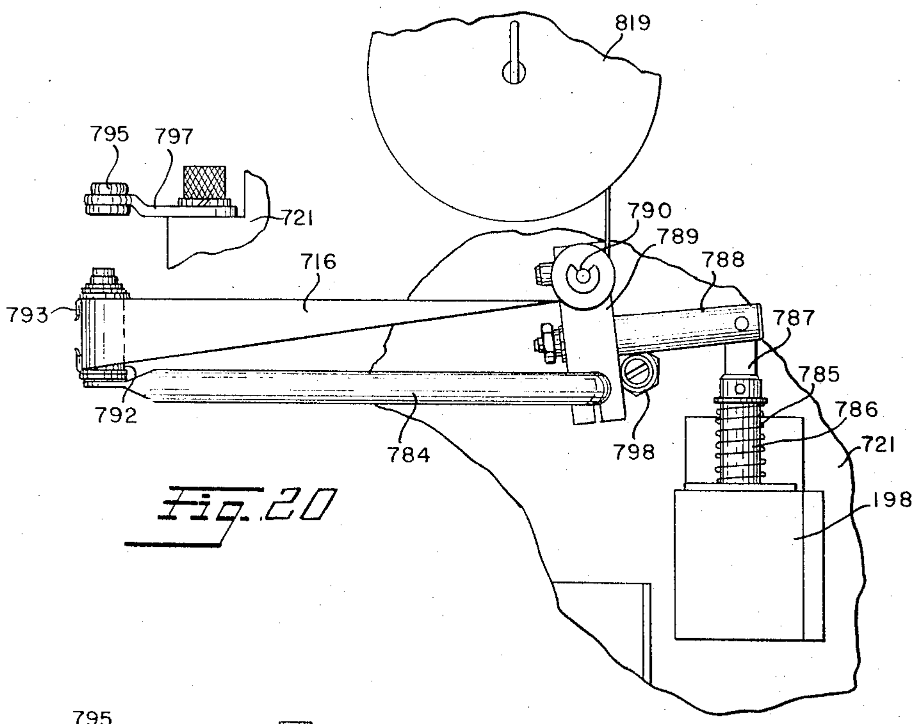
Figure 21:
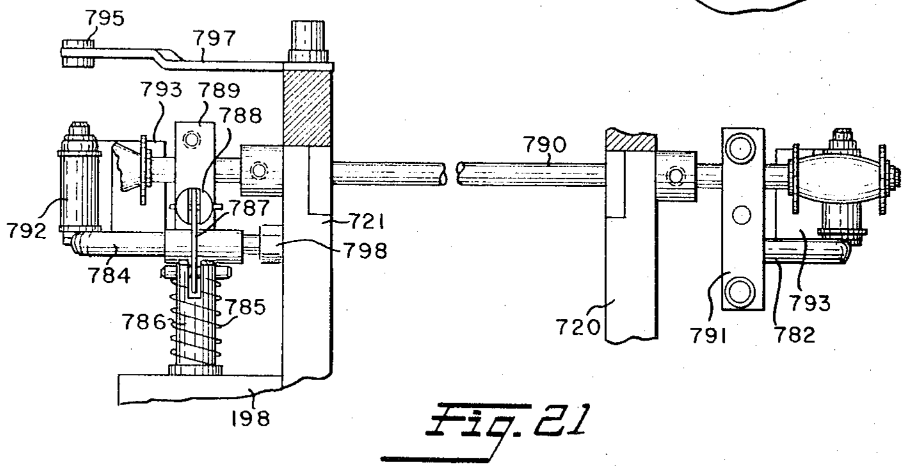
Figures 22, 23, 24:
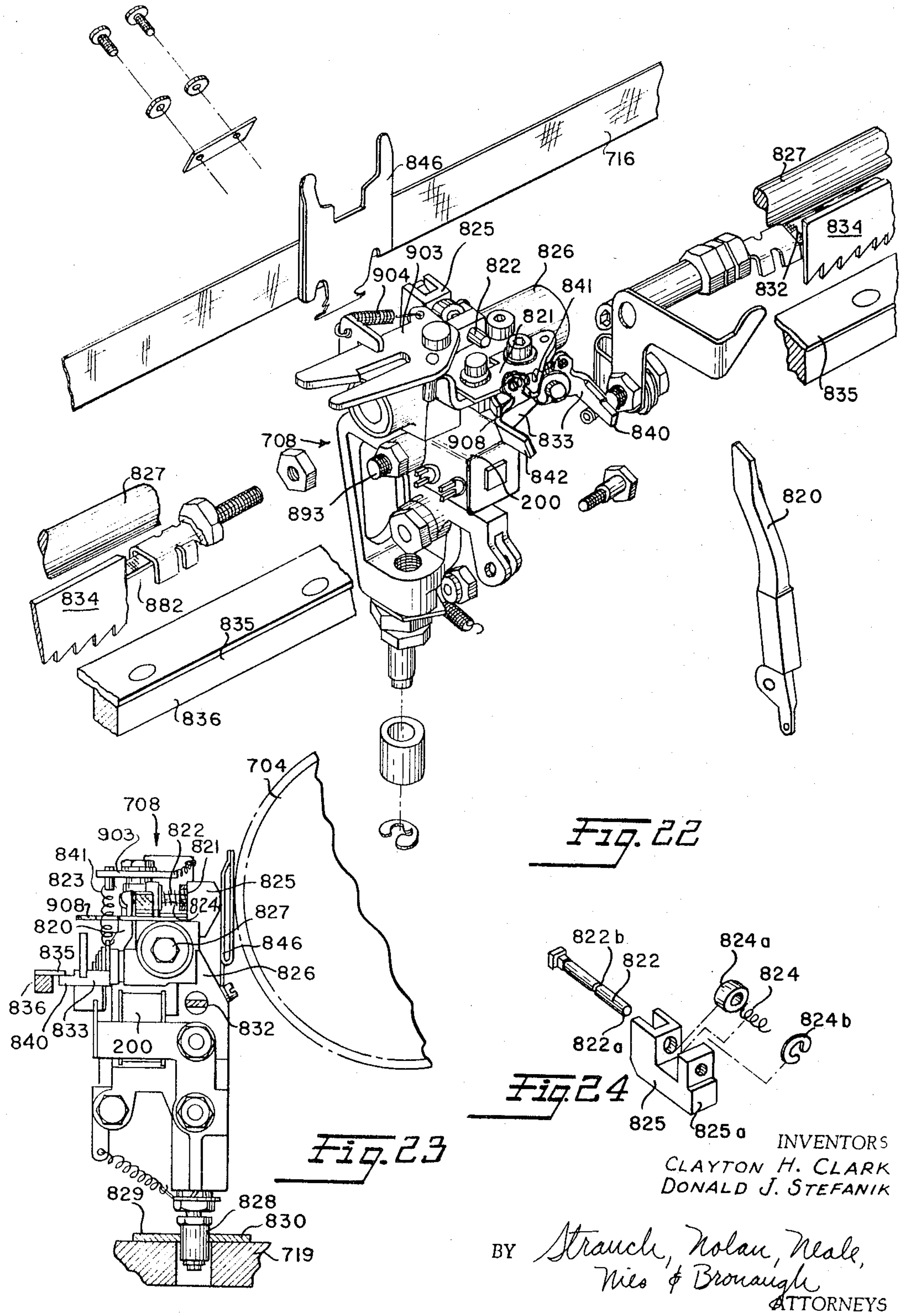
Figure 25:
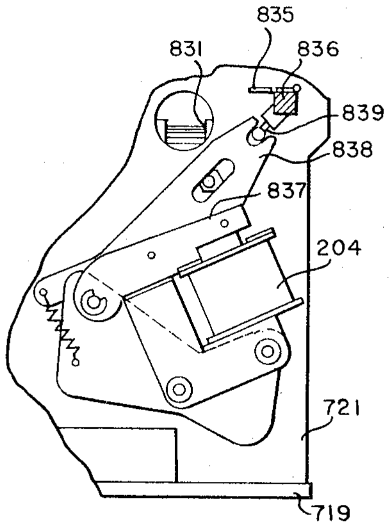
Figure 26:
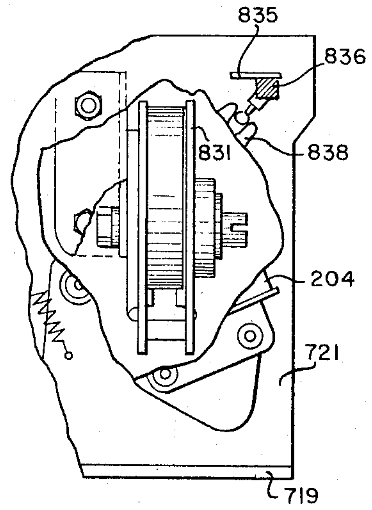
Figure 27:
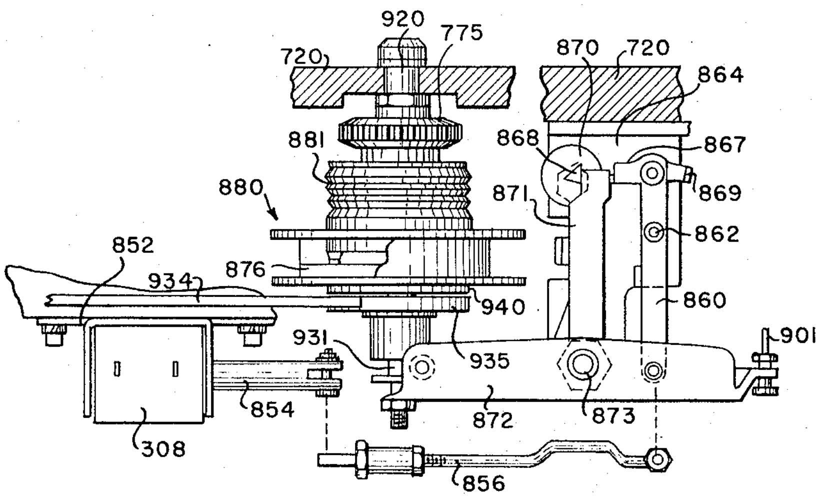
Figures 28, 29:
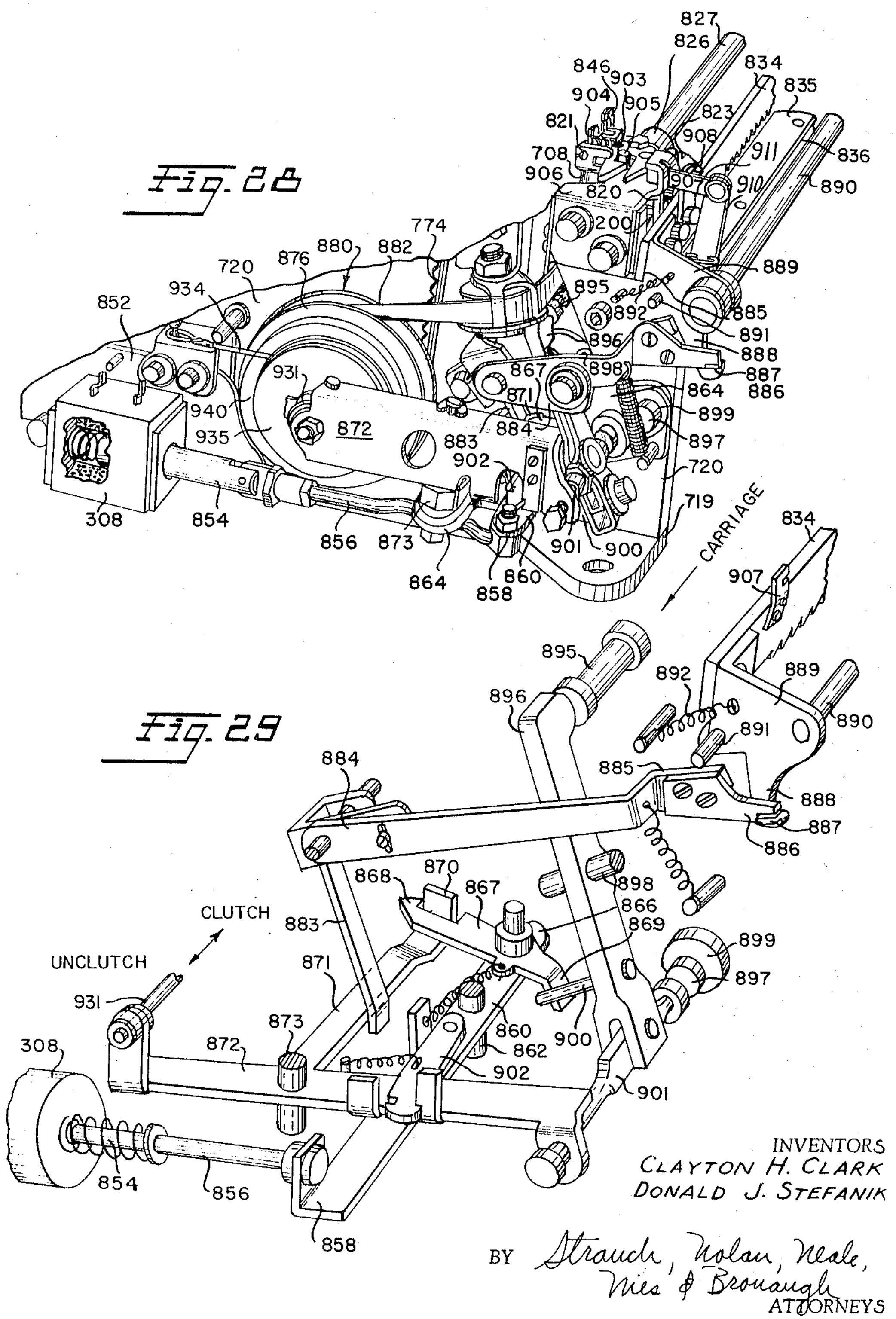
Figure 30:
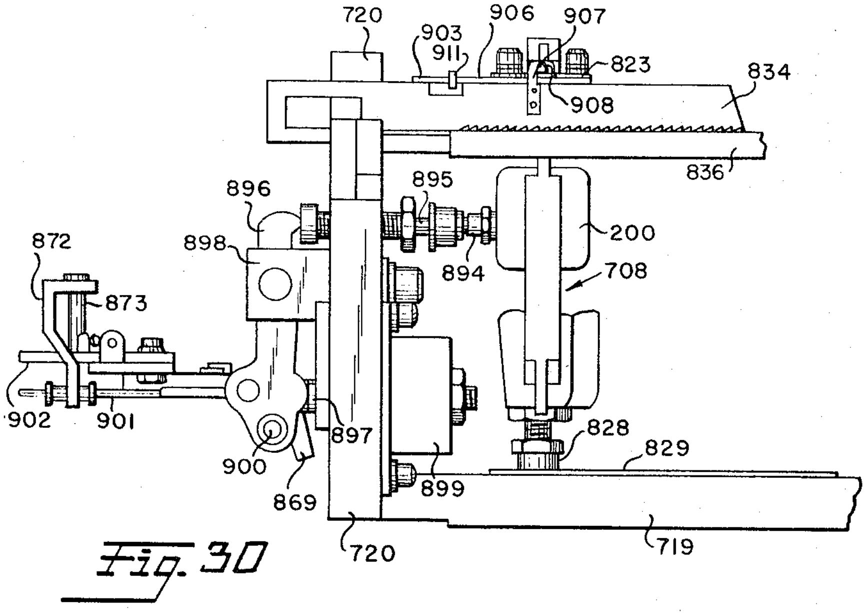
Figure 31:
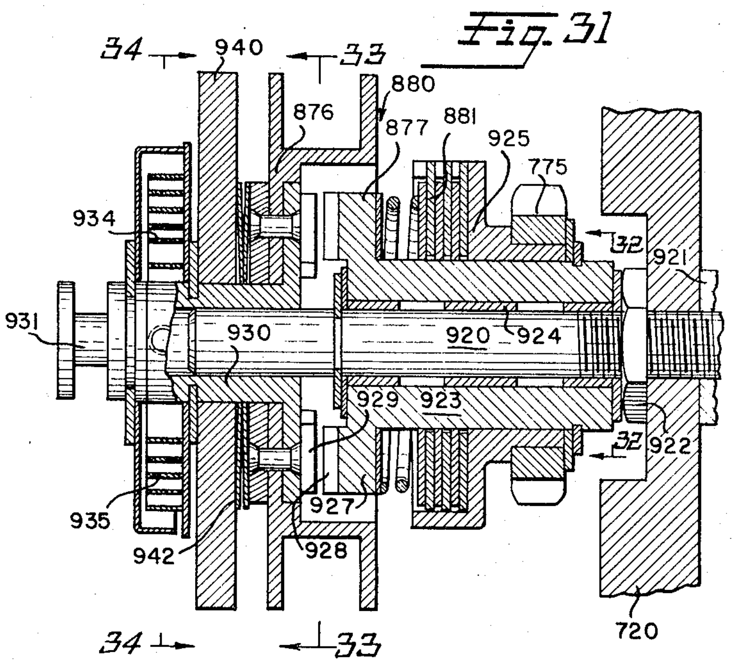
Figure 32:
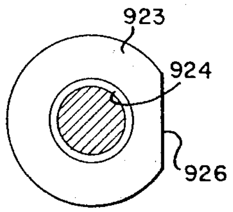
Figure 33:
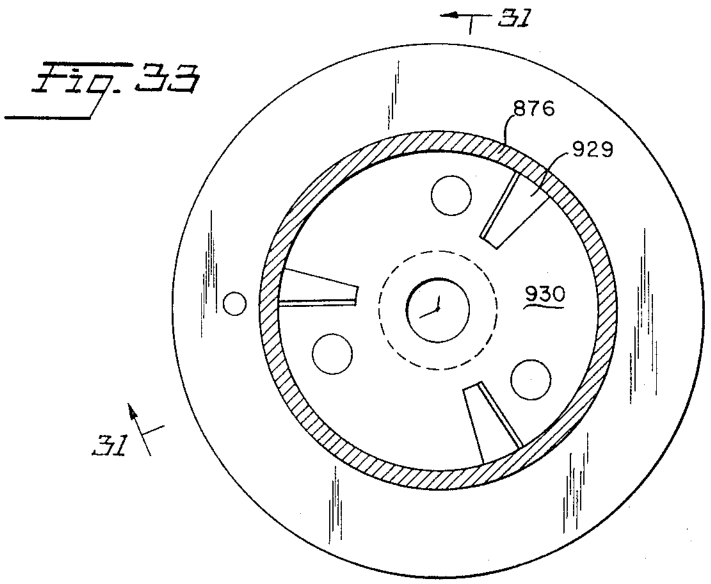
Figure 34:
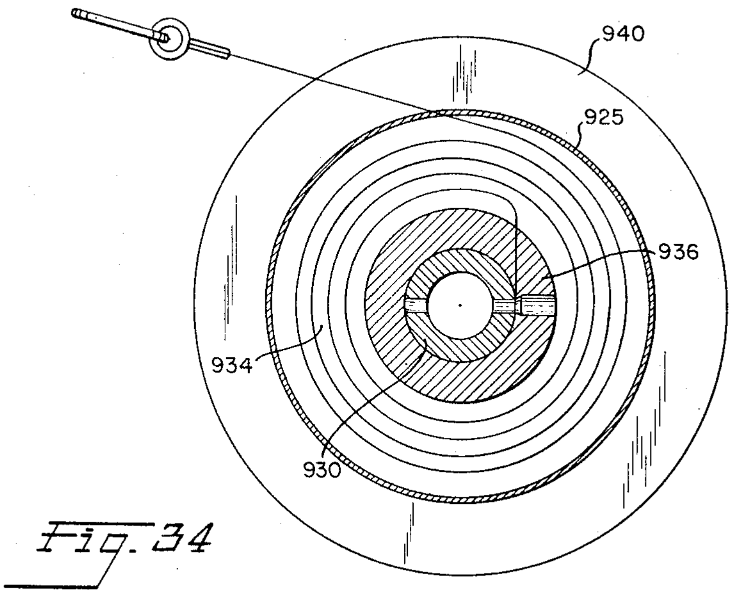

FIGURE 7 includes 14 separate blocks identified by the letters A through P, each illustrating a basic schematic circuit corresponding to a specific logic symbol and enabling convenient construction of the electronics represented by the following logic diagrams;

FIGURE 8 is shown on two sheets as FIGURES 8A and 8B and is a logic diagram for the electrical and electronic circuitry of the printer;

FIGURE 9 is a timing chart for the printer operations;

FIGURE 10 is a chart indicating the character position on each of the plurality of typewheels in the drum with superimposed pulsing clock teeth for each character to cover the alternate positions of the index pulses and the positions of the pulsing notches for letters and figures (see also FIGURE 15), together with a chart showing the Baudot position representations of each character together with their binary numerical positions and the pulse count which is set into the printer electronic counter components;

FIGURE 11 is an auxiliary timing chart representing the automatic carriage return functions of the printer;

FIGURE 12 is a front perspective view of the printer, primarily to illustrate the general arrangement of printer components and therefore omitting many details which are illustrated in the following figures;

FIGURE 13 is a partially sectioned elevation view showing the print drum with its drive gear, clock assembly, and bearing mounting and also illustrating the paper feed components;

FIGURE 14 is a partially sectioned and partially exploded detail perspective view illustrating the left hand drum bearing housing assembly and the drum clock components;

FIGURE 15 is a diagrammatic view of the drum clock disc showing relative positions and overlapping paths of the indexing and LTRS and FIGS notches, as well as the positions of the clock heads relative to each other;

FIGURE 16 is a side elevation view of one of the plurality of double typewheel discs from which the type drum is assembled;

FIGURE 17 is a layout detail view of a portion of the double type on the periphery of a typewheel;

FIGURE 18 is a machine drawing detail, shown in section taken on lines 18—18 of FIGURES 16 and 17, and illustrates the drum assembly register slot and the requisite manufacturing tolerances for a disc with standard teletypewriter characters;

FIGURE 19 is an elevation detail view from the righthand side illustrating the paper feed pressure roller mounting and the paper feed ratchet, pawl and solenoid, one of the feed wheels being shown only in outline;

FIGURE 20 is a detail view taken from the righthand side of the printer illustrating the righthand ribbon lift assembly which includes the ribbon lift solenoid;

FIGURE 21 is a detail view from the rear illustrating the ribbon lift components;

FIGURE 22 is a detail perspective of the print hammer carriage assembly, several components being illustrated in exploded position for clarity;

FIGURE 23 is a side elevation view of the print hammer carriage assembly looking from the righthand side;

FIGURE 24 is a detail exploded perspective of the print hammer block subassembly;

FIGURE 25 is a detail elevation view of the inside of the righthand printer support plate showing the space solenoid assembly;

FIGURE 26 is an elevation view from the same position as FIGURE 25 excepting that a wall portion is broken away to show the print hammer carriage spacing spring drum;

FIGURE 27 is a detail plan view of the carriage return clutch, its operating solenoid and some of the operating linkage, and will be more clearly understood if analyzed together with FIGURES 28 and 29;

FIGURE 28 is a perspective view looking at the carriage return operating mechanism mounted on the outside of the lefthand vertical support plate;

FIGURE 29 is a skeleton schematic of the carriage return operating links (actual assembly seen in FIGURE 28), latches, etc. with all fixed support pivot pins (or studs) having hatched ends;

FIGURE 30 is a detail front elevation view showing only the linkages which accomplish tripping of latches and declutching upon completion of carriage return to a start-of-line position;

FIGURE 31 is an enlarged cross-section view of the carriage return clutch and return belt drum assembly; and FIGURES 32, 33 and 34 are sections taken on lines 32—32, 33—33 and 34—34, respectively, of FIGURE 31, illustrating the sleeve flat used to lock the discs on the driven member of the input friction clutch, FIGURE 33 illustrating the form of teeth on the positive clutch members, and FIGURE 34 illustrating the preliminary return spring drum.

GENERAL

Figure 1:
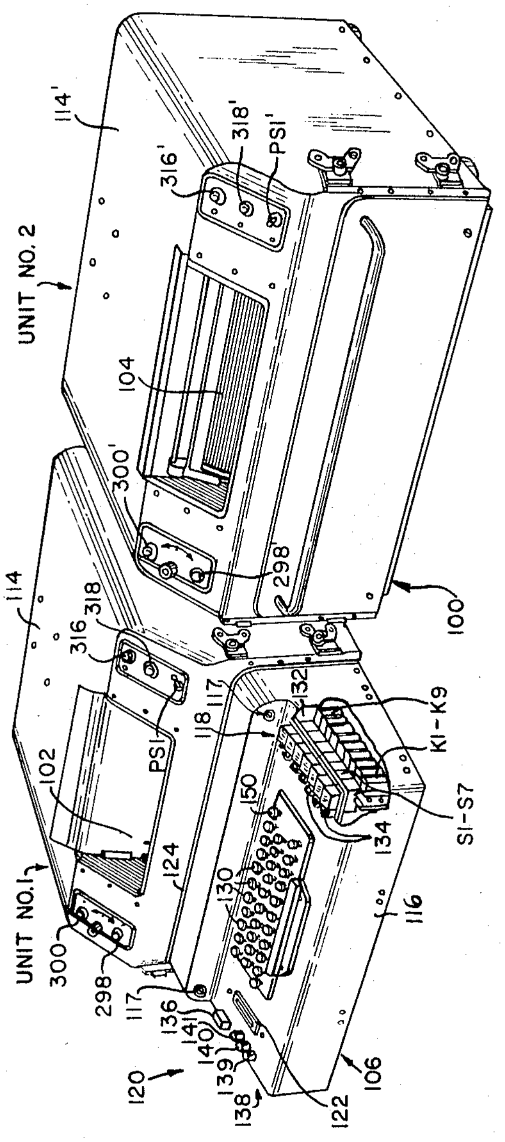
FIGURE 1 is a perspective view of a teletypewriter set utilizing printers constructed in accord with the present invention with Unit 1 on the left and Unit 2 on the right.

An over-all view of the exemplary teletypewriter set 100 is shown in perspective in FIGURE 1. This equipment was initially developed for shipboard installation for use in telegraphic communication from ship-to-ship and from ship-to-shore, and accordingly, certain aspects of weatherproofing are included in this disclosure.

The complete set is a send-receive teletypewriter set designed for keyboard sending and magnetic tape recorder sending, page copy monitoring and page copy receiving. Two or more sets can be interconnected directly and operated with, or without, the use of intermediate equipment. Simultaneous sending and receiving is possible with a set, one call being received on one printer 102 of the set, a second call being received on the second printer 104 of the set, and a third call being sent from either the keyboard 106 or the tape recorder (not shown).

The set can operate at 60 or 100 w.p.m. in conjunction with three separate loops: two receive, and one send. A tone frequency of 1200 cycles is employed on the loops for neutral, start-stop, Baudot-code signaling.

By suitable redesign the units of the set can accommodate other codes.

A complete teletypewriter set (FIGURE 1) consists of two units, Unite 1 and Unit 2. Unit 1 contains a printer 102, a keyboard unit 106, a magnetic tape recorder (not shown) and a power supply unit (not shown). Unit 2 contains a printer 104 and a power supply unit (not shown). Manual control of the various operations of the set is maintained from the panels on the keyboard unit 106 of Unit 1.

Seven mode pushbuttons 132 and seven associated lamps 134 (see FIGURE 1) make up the mode selection panel 118 to the right of the typing keys. The pushbuttons allow the operator to select a mode of operation for either Unit 1 or Unit 2. Momentary operation of a pushbutton causes operation of an associated switch and electrical locking of one or more associated mode relays K1–K9 and also lights a corresponding lamp 134 (DS1–DS7) on the mode selection panel 118. With the pushbuttons, the operator can place the set in the following modes:

(1) IDLE (RECEIVE)—In the idle mode, the motors of both printers are off; the RECEIVE lamp DS5 is on; and the set is available for local use, for receiving from another station, or for both, simultaneously. Operation of the RECEIVE pushbutton places the set in the idle mode and discontinues all other modes except the RECEIVE mode. To set up an incoming call to this station, associated telegraph terminal group equipment (not part of this invention) operates a supervisory relay in Unit 1 or Unit 2 to turn on the associated printer motor and thus place the set in the RECEIVE mode.

(2) STORE—The STORE mode connects the parallel output of the keyboard unit 106 to the tape recorder and the serial output of the same keyboard unit 106 to the printer 102. This allows the operator to store a message prior to sending it to the outgoing line and to monitor the storing process. Operation of the STORE pushbutton places the set in the STORE mode and lights the STORE lamp DS4. After typing the message to record it on the magnetic tape, the operator presses the REWIND pushbutton 136 on the recorder monitor panel 120. This action causes the tape recorder to rewind and thus places the message on the tape in a position to be read and sent to the line.

(3) NO ADVANCE—The NO ADVANCE mode duplicates the STORE mode except that a blank area (used as a signal condition as will be fully described hereinafter) is not inserted on the magnetic tape just ahead of the recorded message. This mode is used after a STORE mode has been interrupted to allow receipt of an incoming message on the Unit 1 printer.

(4) SEND KEYBOARD—To set up a call to the outgoing line, the operator presses the SEND KEYBD pushbutton. This extends a D.C. supervisory ground from the connecting equipment to a mode switching relay (which operates from and locks to the supervisory ground). The RECEIVE lamp DS5 turns off and the SEND KEYBD lamp DS1 turns on. In the SEND KEYBD mode, it is possible to receive on Unit 1 printer 102 or on Unit 2 printer 104 or on both printers simultaneously; the output of the keyboard does not appear on the Unit 1 printer 102 as it does during the STORE mode. All characters typed on the keyboard during this mode are sent to the outgoing line.

(5) SEND RECORD—To send from the recorder to the outgoing line during the SEND KEYBD mode, the operator presses the SEND RECORD pushbutton. This starts the tape recorder which will send one tape recorded message and then stop automatically.

(6) TEST 1—The TEST 1 mode allows the operator to test the Unit 1 printer by typing directly into it.

(7) TEST 2—The TEST 2 mode allows the operator to test the Unit 2 printer by typing directly into it.

As determined by the mode of operation, the Unit 1 printer 102 is used to receive messages from an incoming line 1 (RECEIVE mode), to monitor the recording process (STORE mode), and to test the keyboard (TEST 1 mode).

Functionally, the printer consists of a printing mechanism (see FIGURE 12), printer electronics (see logic diagram FIGURES 8A and 8B), two control panels mounted (see FIGURE 1) on the front panel of the cover unit, a bell mounted inside of the cover (not shown), and a time base selection switch. The printer electronics are principally physically contained on a large printed circuit board (not shown). Most of the high-power transistors in the printer and recorder circuits, for convenience, are mounted in heat sinks (not shown) on the rear of the cover 114.

The printing mechanism will be more fully described hereinafter, but, briefly, employs a rotating drum composed of thirty-six double row type wheels, or a total of 72 rings of type, each ring having the 52 standard communication symbols (FIGURE 2). For weather symbols, the drum has 76 rings of type, each ring having the 52 weather symbols (FIGURE 2). A print hammer is moved from left to right in front of the drum under an escapement type spring-biased stepping mechanism and strikes the drum once per revolution for each character to be printed. The printing mechanism has a pulse clock mechanism which supplies a series of pulses to the printer electronics representative of drum rotational position. Since each pulse represents a new character in the printing position, the pulses furnish information which allows the printer electronics to energize the print hammer solenoid as the desired character moves in front of the hammer. Characters on each ring of type are placed in binary order according to the Baudot code for the character (see FIGURE 10). Thus, each character is assigned to a position in a 32-count, binary progression so that the printer electronics can compare an incoming character against the series of pulses that indicate the physical position of the drum characters.

The main functions of the printer electronics are as follows: (1) Register in parallel form the five serial information bits of an incoming character. (2) Determine whether the five bits represent either a printing or a machine function character. (3) Determine what the machine function is. (4) Shift the five bits into a second set of registers to make room for the following character while the first character is being printed or while the represented machine function is being performed. (5) Shift the five bits into a third set of registers to make room for two characters during an automatic carriage return period. (6) Control ribbon lifting so that the ribbon will be raised before the print solenoid is energized. (7) Under control of character-position pulses from the printing mechanism, determine when the character corresponding to the registered character is about to pass the print hammer. (8) Control energizing of the print solenoid. (9) Control operation of the spacing mechanism after the character is printed. (10) Control operation of the carriage return and line feed mechanisms.

The Unit 1 Power Supply 110 (see FIGURE 4) converts 115-volt, 400-cycle, single-phase power into the D.C. voltages required by Unit 1. The output voltages are regulated to provide negative 33 volts for the driving transistor collectors and the associated solenoids that perform such machine functions as keyboard locking, printer spacing, and recorder tape advance; negative 20 volts for the one-shot and amplifier collectors that precede the driving transistors of the printer and recorder; negative 12 volts for the collectors of all other transistors; and positive 5 volts for the biasing of most transistors. Unregulated 28 volts also is provided for the switching relays, keyboard lamps, and printer copy lamps.

Power supply components such as the input transformer 160, filter capacitors C–1, C–2, C–3, and C–4, and resistors are mounted as a subcomponent 110 on the Unit 1 drawer behind the printer mechanism. Other components such as the power transistors and reference diodes which present heat dissipation problems as has been described are located on heat sinks (not shown) mounted on the outside rear of the printer cover.

OVER-ALL FUNCTIONAL DESCRIPTION

Figure 3:
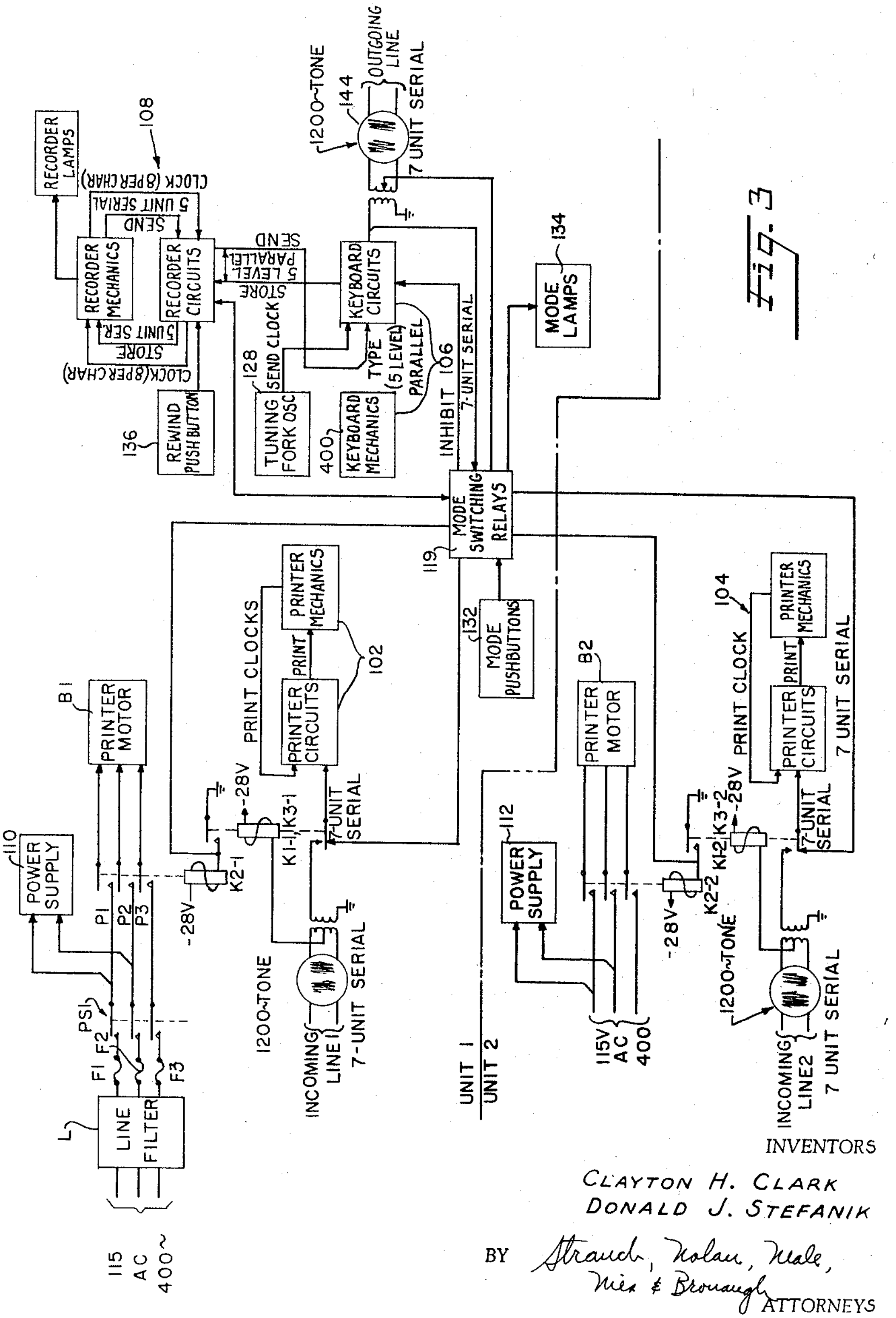
FIGURE 3 is a block diagram illustrating the operating functions of the complete teletypewriter set depicted in FIGURE 1.
Figure 5A:
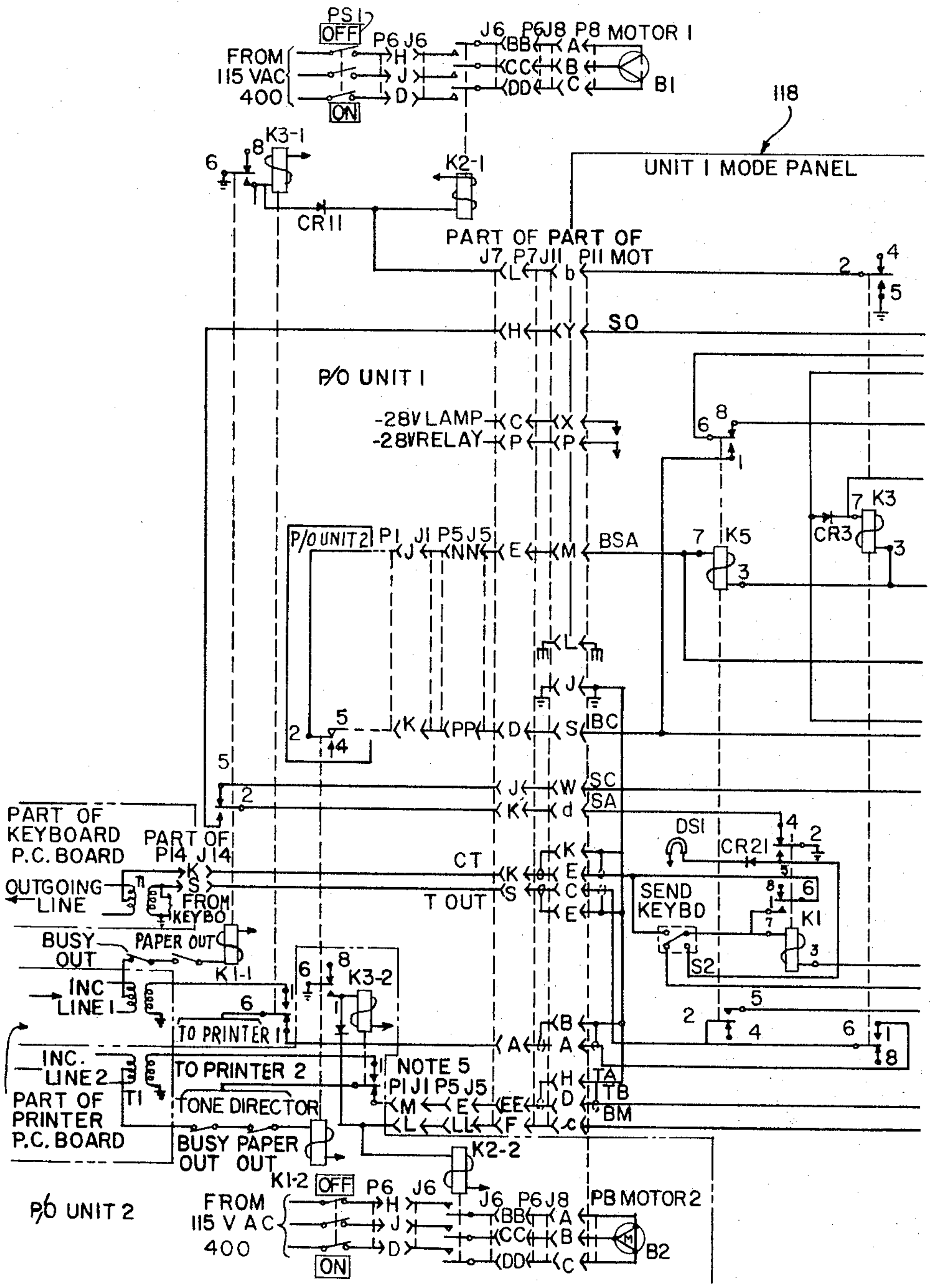
FIGURE 5 is shown on two sheets as FIGURES 5A and 5B and is a schematic illustrating the circuitry of the mode control panel on the keyboard unit and, for convenience, some components of correlated subassemblies in the teletypewriter set.
Figure 5B:
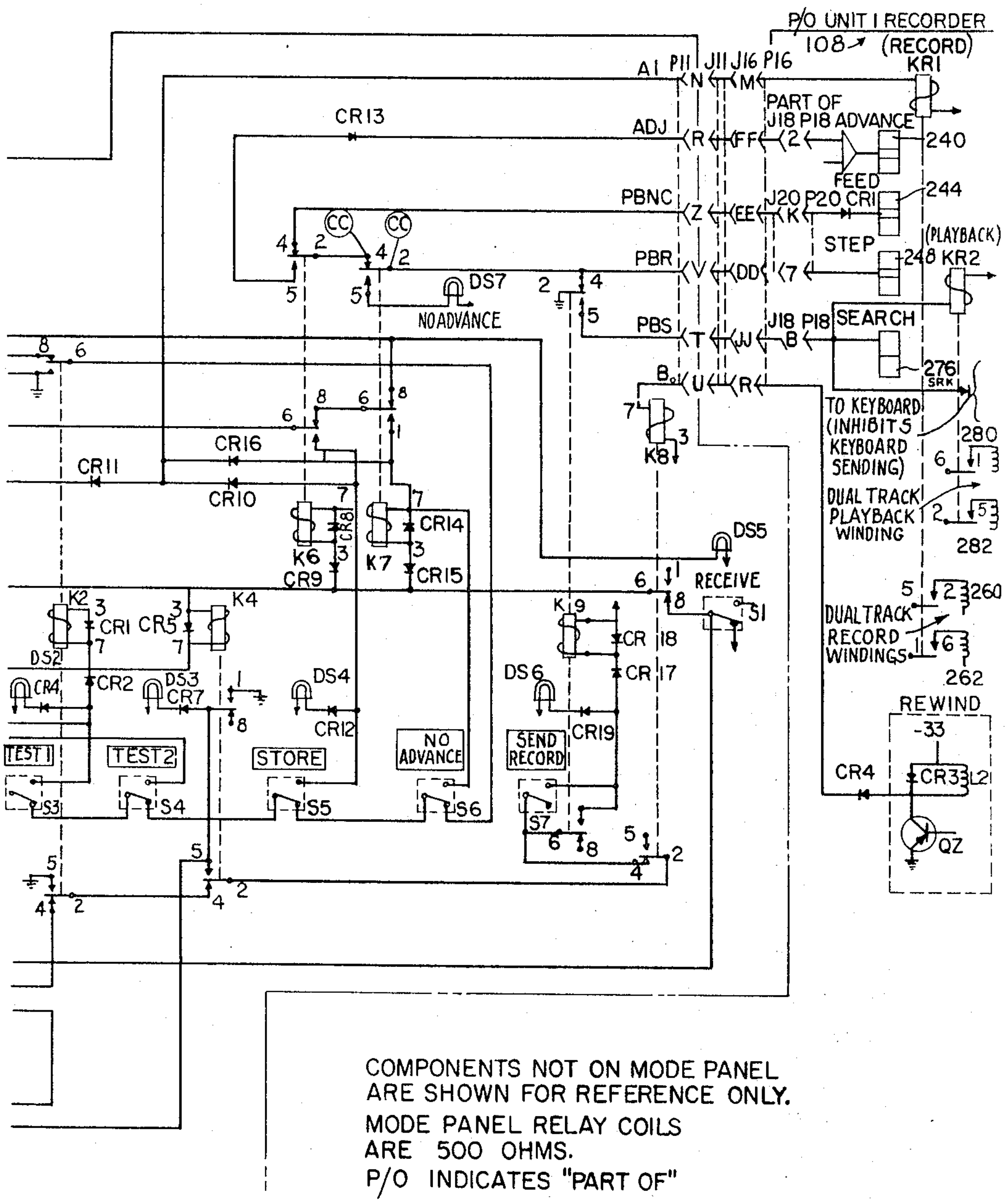

FIGURE 3 shows the various functional sections and associated external signaling lines of the exemplary teletypewriter set, FIGURE 4 shows the power supply circuit and FIGURES 5A and 5B viewed as a single figure show the mode panel control circuits.

As a general rule, final control of both incoming and outgoing transmission to and from the exemplary set will originate from associated telegraph terminal group equipment (not shown).

*Incoming messages.*—Referring primarily to FIGURES 5A and 5B, to seize Unit 1 and turn on the printer motor B1, associated terminal group equipment (not shown) provides ground potential to incoming line 1 (lower left corner of FIGURE 5A) on a simplex basis. Relays K1–1 and K3–1 operate over this supervisory path, in turn operating relay K2–1 to turn on the printer motor B–1. To seize Unit 2 and turn on its printer motor B–2, the associated equipment provides ground potential to incoming line 2. Relays K1–2 and K3–2 operate over this supervisory path, operating relay K2–2 to turn on driving motor B–2.

*Outgoing messages.*—Since outgoing transmission depends on the availability of remote switching equipment (not shown) the associated equipment (not shown) will of course determine when a call can be originated. To request use of the outgoing line, the local operator depresses the KEYBD SEND push button to operate switch S–2 to connect a mode relay K1 to the outgoing line. If the associated equipment is available, ground potential is applied to the outgoing line on a simplex basis, completing a circuit for the mode panel relay K1. Relay K1 locks to the supervisory ground signaling through its relay terminals 1 and 6 and lights the SEND KEYBD lamp DS–1 through relay terminals 2 and 5 to signal the operator that sending may start.

*Store.*—The STORE mode pushbutton, through switch S5, lights the STORE lamp DS4 and energizes relays K6 and K3 which (a) prepare the circuits of the recording head windings through recorder relay KR1, (b) keep the STORE lamp DS4 lighted, (c) lock under control of contacts 2 and 5 of the RECEIVE mode relay K1–1 so that the associated equipment can interrupt the STORE mode, and (d) as described under a following section entitled Recorder Logic, trigger the advance controller of the recorder circuitry through contacts 2 and 5 of relay K–6 to advance a small amount of tape over the recording head. This blank portion of tape will act as an end-of-message signal for the first of two messages stored successively. Further, the operated mode panel relays K6 and K3 (a) start the Unit 1 printer motor B1, and (b) connect the output of the keyboard through contacts 1 and 6 of relay K3 and contacts 6 and 8 of supervisory relay K3–1 to the input of the Unit 1 printer 102 so that the printer will monitor what is being stored.

*No advance.*—The NO ADVANCE mode pushbutton, through switch S6, lights the NO ADVANCE lamp DS7 and energizes mode panel relays K7 and K3 which (a) prepare the circuits of the recording head windings, (b) keep the NO ADVANCE lamp DS7 lighted, and (c) lock under control of the RECEIVE mode relay K1–1 so that the associated equipment can interrupt the NO ADVANCE mode (which is an auxiliary STORE condition). Note that the advance control of the recorder is by-passed in this mode and no blank tape is inserted ahead of the stored message. Further, the operated mode panel relays K7 and K3 (a) through contacts 2 and 5 of relay K3, start the Unit 1 printer motor B1, and (b) through contacts 1 and 6 of relay K3, connect the output of the keyboard 106 to the input of the Unit 1 printer 102 so that the printer 102 will monitor what is being stored in recorder 108.

*Sending control.*—Control of the keyboard 106 and recorder 108 during sending to the outgoing line is maintained from the mode panel pushbuttons 132 as soon as an outgoing line is made available by the associated equipment.

*Keyboard.*—The keyboard 106 is always connected to the outgoing line. As soon as the SEND KEYBD lamp DS1 lights when the SEND KEYBD pushbutton switch S2 is operated, associated equipment is available to extend the call to the desired station and the operator may start typing.

*Incoming signaling.*—The mark signal on either incoming line is a continuous 1200-cycle tone. The tone is removed to indicate a space signal. A tone detector included in the printer circuits responds to the 1200-cycle tone to keep a transistor on for mark and to turn it off for space.

*Serial-to-parallel conversion.*—An incoming character consists of seven bits, each bit a space or a mark (see FIGURE 2). The first bit or start pulse readies the printer circuits to register each of the next five bits or code elements separately. Once the five code elements are registered, the printer circuits determine what the character is and cause the corresponding character to be printed or the corresponding machine function to be performed. The stop pulse is not used by the exemplary printer circuits which will be hereinafter described.

MODE CIRCUIT OPERATION

FIGURE 3 shows the mode panel and its associated circuits in schematic form. The following theory explanation shows how the relays of the mode panel switch the various internal and external connections of the teletypewriter set under control of both the associated equipment (not shown) and the local operator.

*Idle condition.*—With no incoming or outgoing traffic, all mode panel relays K1 through K9 are released, and the two supervisory relays K1–1 and K1–2 for printer 102 are released. Motor B2 control relays K2–1 and K2–2 are also released and the printer driving motors B1 and B2 are off. Further, incoming line relays K3–1 and K3–2 are released. The RECEIVE lamp DS5 is lighted during the idle condition through the following circuit: negative 28 volts through lamp DS5, contacts 8 and 6 of relay K7, contacts 8 and 6 of relay K6, contacts 8 and 6 of relay K5, contacts 8 and 6 of relay K2, normally closed contacts of the NO ADVANCE, STORE, TEST 2 and TEST 1 switches, pin W of P11–J11, pin J of P7–J7, contacts 5 and 2 of relay K1–1, pin K of J7–P7, pin *d* of J11–P11, contacts 4 and 2 of relay K1, to ground.

*Receive condition.*—The associated equipment provides ground potential to incoming line 1 or 2 to signal the corresponding Unit 1 or Unit 2 printer to receive. This simplex ground signaling operates relay K1–1 or K1–2. Hence, if Unit 1 is to receive, line 1 is grounded and the following events occur. Battery-connected relay K1–1 operates, and switches the operating circuit for RECEIVE lamp DS5 through contacts 2 and 4 so that now only relay K1 controls the RECEIVE lamp. The RECEIVE lamp remains on as a signal that a message will be sent to the set. Relay K1–1 energizes relays K2–1 and K3–1 from ground through its contacts 6 and 1. Diode CR11, in the operating path of relay K3–1, will allow current to flow from contacts 6 and 1 of relay K1–1 to the coil of relay K2–1, but will block current flow in the opposite direction when relay K2–1 is operated by mode panel relay K3. Relay K2–1 then turns on the printer motor of Unit 1. Relay K3–1 then connects the incoming signal line to the printer electronics through its contacts 6 and 1, and disconnects the keyboard output circuit from the printer electronics. During the STORE mode (as will be explained hereinafter) relay K3–1 is released to disconnect the incoming signal line from the printer while the keyboard is sending. The mark tone on the incoming line would otherwise prevent the printer from monitoring what is being sent by the keyboard. At the end of the message, the associated equipment removes ground potential from incoming line 1. Relays K1–1, K2–1, and K3–1 release, the printer motor B1 of Unit 1 turns off, and the RECEIVE lamp DS5 remains lighted. Operation of the STORE pushbutton completes a circuit for relay K6 as follows: negative 28 volts through RECEIVE switch S1, contacts 8 and 6 of relay K8, blocking diode CR9, coil of relay K6, operated contacts of STORE switch S5, non-operated contacts of switches S4 and S3, pin W of P11–J11, pin J of P7–J7, contacts 5 and 2 of relay K1–1, pin K of J7–P7, pin *d* of J11–P11, contacts 4 and 2 of relay K1, to ground. Relay K6 operates and turns off the RECEIVE lamp DS5 through contacts 8 and 6; locks itself to the same operating ground that was used by the RECEIVE lamp through contacts 6 and 1; and extends ground to the recorder to trigger the advance one-shot through contacts 2 and 5. The STORE lamp DS4 lights from the same circuit that holds relay K6 operated. The recorder advances the tape a set amount to assure that any variation in the commutator contacts that light the start-of-tape lamp will not prevent recording from starting on a usable portion of the tape.

The same circuit that operates relay K6 also operates relay K3 as follows, starting from ground already traced to terminal 7 of relay K6: diode CR10, diode CR11, coil of relay K3, contacts 6 and 8 of relay K8, normally-closed contacts of the RECEIVE switch S1, to negative 28 volts. Operated, relay K3 at contacts 1 and 6 completes a circuit from the keyboard output to the printer 102 input as follows: keyboard connectors P14–J14 pin S, connectors J7–P7 pin S, mode panel connecors J11–P11 pin C, contacts 6 and 1 of relay K3, connectors P11–J11 pin A, connectors P7–J7 pin A, contacts 8 and 6 of relay K3–1, to the printer 102 electronics. This path allows the information being stored in the recorder to appear also on the printer 102 of Unit 1. Mode panel relay K3 operates power supply relay K2–1 through contacts 5 and 2 which supplies power to the motor B1 of printer 102.

To interrupt the STORE mode for an incoming message, the associated equipment places ground potential on incoming line 1. Relay K1–1 operates; lights the RECEIVE lamp DS5 through contacts 2 and 4; releases relays K6 and K3 through contacts 2 and 5; turns off the STORE lamp DS4; and releases recorder relay KR1. Relay K1–1 holds relay K2–1 operated through contacts 6 and 1 to keep the motor running, and operates relay K3–1 to connect incoming line 1 to the printer tone detector.

*Test 1.*—To test the printer of Unit 1, the operator depresses the TEST 1 pushbutton. Operated, TEST 1 switch S3 turns on the TEST 1 lamp DS2 and operates relays K2 and K3. Relay K2 prepares a circuit for SEND RECORD relay K9 through contacts 2 and 5, and locks under control of power supply relay K1–1 through contacts 1 and 6. Relay K3 turns on the printer motor B1 of Unit 1 and connects the output of the keyboard to the input of the printer of Unit 1, as has been described above. The operator can now type into the printer 102 of Unit 1, or by depressing the STORE pushbutton, can type into the recorder 108 and the printer 102 simultaneously, or by depressing the SEND RECORD pushbutton, can start the recorder 108 sending to the printer 102.

The TEST 1 mode is discontinued by depressing the RECEIVE pushbutton. Operated, switch S1 releases relays K2, K3, and K6 if operated. Also, the associated equipment can discontinue the TEST 1 mode, if a message is coming in, by grounding incoming line 1. Relay K1–1 operates and releases relays K2 and K3 through contacts 2 and 5.

KEYBOARD, PRINTER AND RECORDER BLOCK DIAGRAM FUNCTIONAL DESCRIPTION

Figure 6:
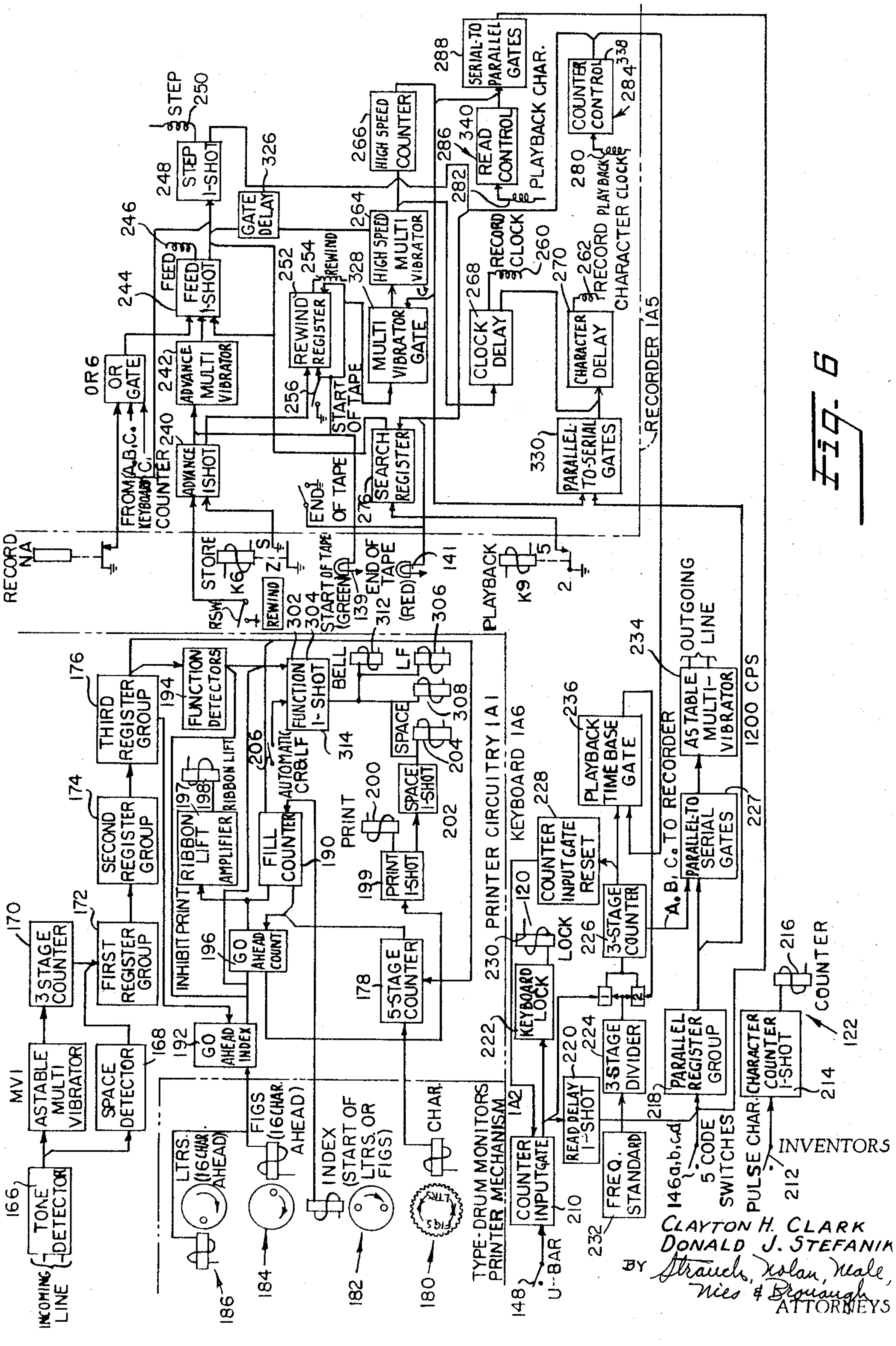
FIGURE 6 is a block diagram more detailed than FIGURE 3 illustrating general electrical, electronic and mechanical components utilized in Unit 1 which includes a keyboard, a printer and a recorder together with a power supply (not shown in this figure)

FIGURE 6 shows the functional sections of Unit 1, with the circuits of major elements represented by blocks. The immediate following description refers to the general circuit functioning of the printer 102. Following this description, a more detailed description of the printer will be given with reference to logic diagrams.

*Printer circuit functioning.*—The block diagram description below expands on the general description of the printer presented hereinbefore.

*Tone detector.*—The tone detector 166 is sensitive to the 1200-cycle mark tone normally on the incoming line. When the tone is removed to indicate the start pulse of a character, the tone detector 166 provides a D.C. transition that (a) triggers a space detector 168 and (b) starts an astable (free-running) multivibrator MV1. When tone is returned to the line, the tone detector 166 provides another D.C. transition in the opposite direction from the first transition.

*Multivibrator MV1.*—When the start pulse of a character starts the multivibrator MV1, it continues to free-run for the duration of the incoming character. The multivibrator MV1 steps a 3-stage counter 170 at a fixed rate such that the counter 170 will change its output once for each of the five sequential code elements of the incoming character. Two different free-running rates are available: one for 60 words a minute and one for 100 words a minute (see switch, FIGURE 8).

*Space detector.*—As long as the 1200-cycle tone is held off the incoming line, the space detector 168 provides a D.C. output level that will allow the 3-stage counter 170 to set successive stages of a first register group 172. The printer electronics will register each of the five code elements that is a space.

*3-stage counter 170.*—The space code elements of an incoming character are gated into the first register 172 by the 3-stage counter 170. The counter is stepped by multivibrator MV1 at a rate equal to the code element rate of the incoming line.

*First register group 172.*—As the five code elements of an incoming character are received sequentially, the 3-stage counter 170 gates each successive code element into the first register group 172 for temporary storage. The first register group consists of four flip-flops, one for each of the first four code elements. The fifth code element is gated into a second register group 174 directly since by the time it is received, the preceding group of code bits will have resulted in its character being printed or will have been shifted into a third register group 176.

*Second and third register groups.*—The second register group 174 provides 5-bit, parallel storage for one incoming character while the following character is being received sequentially and stored in parallel form in the first register group 172. To allow three characters to pile up during the time period necessitated by the machine function of automatic carriage return, the third register group 176 is provided to allow the second register group 174 to be cleared even though its stored character has not yet been printed.

*Character-position indicators.*—The printer electronics is supplied with character-position pulses by four type-drum rotational position monitors 180, 182, 184 and 186. These pulses indicate (a) when a character on the continuously rotating type drum is in the printing position, and (b) what the character is. For each revolution of the printer type drum, the following pulses are provided:

(1) 64 character pulses are provided, one pulse for each new character (32 Letters positions followed by 32 Figures positions) passing the print hammer. These pulses step a 5-stage counter 178.

(2) One letters pulse is provided, 16 characters before the first letters character passes the print hammer; one figures pulse is provided, 16 characters before the first figures character passes the print hammer. These pulses start the ribbon lifting function and also gate the registered character in register 176 into appropriate stages of the 5-stage counter 178 under control of a fill-counter register 190.

(3) Two index pulses are provided, one occurring as the first letters character starts to pass the print hammer, and the other occurring as the first figures character starts to pass the print hammer. Depending on whether a letter or a figure is to be printed, either one pulse or the other resets the fill-counter register 190 as a signal that printing may occur thereafter when the 5-stage counter 178 finishes its countdown. The number of counter steps required to finish countdown depends on the character stored in the third register group 176 since the character indication was used to preset the 5-stage counter 178 initially.

*Go-ahead index 192.*—This is a flip-flop register, reset when a character is first registered in the third register group 176. The next following letters or figures pulse from monitors 184 or 186 can then set the flip-flop register 192, producing an output pulse that starts ribbon lifting and presets the 5-stage counter 178 to a number count representative of the registered character. If a machine function (space, bell, etc.) is registered in the third register 176, the function detectors 194 inhibit the output of the go-ahead index 192 from triggering ribbon lift or printing.

*Go-ahead count 196.*—This is a flip-flop register which is set when the go-ahead index register 192 is set and a machine function has not been detected. It triggers a ribbon lift amplifier 197 to energize a ribbon lift solenoid 198 and sets the fill-counter register 190. The ribbon will be raised in front of the print hammer by the time 16 characters have passed the print hammer. The next following index pulse from monitor 182 resets the fill-counter register 190. Finally, when the 5-stage counter 178 finishes its countdown, the go-ahead count register 196 is reset, opening the ribbon lift circuit and closing a circuit to a print one-shot 199 to energize a print hammer solenoid 200.

FILL COUNTER 190 is also a flip-flop register, set when the go-ahead count register 196 is set. It gates the registered character from the third register group 176 into the 5-stage counter 178. The next following index pulse from pulse monitor 182 resets the fill-counter register 190. Reset, it provides a level that will allow an output pulse from the 5-stage counter 178 to reset the go-ahead count register 196 and thereby initiate printing through the print one-shot 199.

5-STAGE COUNTER 178 compares the registered character with the type drum characters passing the print hammer. Gating the registered character into the counter 178 presets it anywhere from 0 to 31 counts (see FIGURE 10), depending on the Baudot code for the character. Sixteen counts before the ribbon has been lifted to the printing position, countdown is started by pulses from the type-drum monitor 180. Therefore, countdown will be completed for 16 different characters before printing can be permitted to occur. For each of these characters, an additional 32 counts are required before the desired character actually passes the print hammer.

*One-shots.*—Mechanical operations such as printing, spacing, carriage return, etc., are initiated by solenoids which are energized by one-shots. A one-shot provides an output for only as long a time as required to trigger the mechanical operation.

*Ribbon lift.*— Ribbon lift is initiated through amplifiers rather than one-shots since the amount of time the ribbon is kept in its raised position will vary, depending upon the drum position of the character to be printed.

*Print and space.*—Printing and spacing are both controlled by the print one-shot 199, printing from one side of the print one-shot flip-flop and spacing through a space one-shot 202 and a space solenoid 204 pulsed from the opposite side of the print one-shot flip-flop 199. This assures that spacing will not start until printing is completed.

*Automatic carriage return and line feed.*—If any incoming message lacks a carriage return at the end of any line, the printer mechanism, through a switch 206, operated by the print hammer carriage reaching end-of-line position as will be hereinafter described, guards against overprinting by automatically returning the carriage and accomplishing a line feeding operation. The switch contacts of switch 206 close to initiate this action when the carriage is stepped from position 71 to 72. If the character for position 72 is not a carriage return, the carriage return and line-feed one-shots 302 and 304 are triggered as soon as the character is printed.

BASIC CIRCUITS AND LOGIC SYMBOLS

FIGURE 7 shows the basic circuits and corresponding logic symbols used in the printer logic diagram of FIGURES 8A and 8B. This section includes a description of each basic printer circuit and the corresponding logic symbol, and the immediately following sections explain the switching logic of the printer as shown on related logic and timing diagrams.

Positive-going transitions are used to transfer information from one transistor stage to another. Logic 1 is defined as zero or ground potential; logic 0 is defined as negative or minus 12 volts potential. Therefore, a positive-going transition is a rapid change from logic 0 to logic 1. This change is available at the collector of a transistor as it is driven from the off state to saturation. In the transistorized circuitry of this invention, a positive transition (that is, positive pulse) will turn off a transistor to set or reset a register or to trigger a one-shot.

The logic symbols shown on FIGURE 7 provide both a logic and a block diagram representation of the circuit shown at the left of the symbol. Input and output leads are designated A, T, Q, etc. on both the circuit and logic symbol to allow exact interpretation. The following points must be understood: (1) If a stage inverts the input signal, the output lead leaves the symbol in a vertical direction as shown in FIGURE 7, blocks A, B, and H. (2) The basic logic symbol for flip-flop stages shows the set state. The upper square of the symbol is always marked 1; the input lead is the setting input; the output lead is the collector of the transistor that is turned on and that, therefore, goes to logic 1 as the stage is set. Similarly, the lower square of the symbol is always marked 0; the input lead is the reset input; the output lead is the collector of the transistor that is turned off by the setting pulse and that, therefore, goes to logic 0 as the stage is set. (3) An inhibiting input is marked with a circle as shown in FIGURE 7, block E, lead I.

*Inverter.*—FIGURE 7, block A shows an inverter or amplifier. The same symbol enlarged with the letters HP (high power) is used on FIGURES 8A and 8B for driver stages that energize solenoids. Transistor Q1 is normally on due to the forward bias −12 volts which is sufficient to override the reverse bias of the +5 volts. A logic 0 on lead A will not change the state of the circuit; therefore, the output on lead T is logic 1. A logic 1 on lead A will block the −12 volt forward bias and allow the +5-volt reverse bias to turn off transistor Q1. With transistor Q1 turned off, a logic 0 is present on output lead T.

*Pedestal gate.*—FIGURE 7, block B shows a pedestal gate, so named because a positive level on input lead A raises the voltage swing used to trigger via input lead B to the point where it can turn off a transistor. Pedestal gates are used extensively since they are so flexible. For example, a triggering pulse can be blocked by having a negative level rather than a positive level on the A input lead. Further, information available as a level can be stored on the gate, to be used at a later time when the triggering pulse is supplied. The diode in the output of a pedestal gate blocks the negative pulse that is inherent in the differentiating action of the circuit. Pedestal gates that are primarily differentiating networks have the A input resistor always at ground potential and are so shown on the printer, keyboard, and recorder logic diagrams.

*Delay.*—FIGURE 7, block C shows the circuit and associated logic symbol used to provide a short delay. Longer delays are provided by one-shots as described below for block L. Transistor Q1 is biased on by the −12 volts present at its base through resistor R1. A positive pulse on lead A turns off transistor Q1. Transistor Q1 remains off until capacitor C1 discharges through resistor R1. The length of the delay is determined by the value of resistor R1 and capacitor C1.

*Single diode gate.*—FIGURE 7, block D shows a diode gate that has only one input. The function of the gate is to pass only positive pulses and to block negative pulses.

*OR gate.*—The truth table in FIGURE 7, block F shows that the output of an OR gate is logic 1 (positive) when any one input is logic 1. With all of the inputs at logic 0 (negative), the output is also at logic 0. A change of any one input to logic 1 provides a positive triggering pulse. FIGURES 8A and 8B show OR gates used as machine function detectors (OR gates OR2, OR5, OR11, OR12, OR13, and OR14). These gates provide a logic 0 level that allows a triggering pulse to set a corresponding one-shot.

*NOR gate.*—FIGURE 7, block G shows a NOR (not OR) gate that is the same as an OR gate except that the output of the OR portion is fed through a transistor to invert the output.

*OR gate with inhibitor.*—FIGURE 7, block E shows an OR gate with an inhibiting input. With logic 1 applied by the inhibitor, it is impossible to produce an output transition from 0 to 1 since the output is always at 1.

*AND gate.*—The truth table in FIGURE 7, block J shows that the output of an AND gate is logic 1 only when all inputs are logic 1. FIGURES 8A and 8B show five AND gates (AND 1, AND 2, AND 3, AND 4, and AND 5) connected to the output of a 3-stage counter. The desired output from each gate is a logic 1 level. The counter supplies this level first, after which a triggering pulse is supplied to the corresponding pedestal gate to, in effect, gate the level into a register.

*NAND gate.*—FIGURE 7, block H shows a NAND (not AND) gate that is the same as an AND gate except that the output of the AND portion is fed through a transistor to invert the output.

*Register.*—FIGURE 7, block K shows a flip-flop register that is used as a temporary storage component. When voltage is initially applied to the circuit, one of the transistors conducts first due to circuit value imbalance. Assuming transistor Q1 turns on, its collector approaches ground. The current from +5 volts through resistor R4, resistor R2, and the collector-emitter junction of Q1 places a level of approximately +2 volts at the base of transistor Q2, insuring its cut-off. A positive pulse applied to lead S is passed by diode CR1 and turns off transistor Q1. The collector of Q1 goes to −12 volts which is present through the cross-coupling resistor R2 to the base of transistor Q2, causing transistor Q2 to turn on. When transistor Q2 turns on, its collector approaches ground. The current from +5 volts through resistor R3, resistor R5, and collector-emitter junction of transistor Q2 places a level of approximately +2 volts at the base of transistor Q1, reverse biasing it. A positive pulse at point R will pass through diode CR2 and turn off transistor Q2. This will flip the circuit back to its original condition. Alternate pulses at point S and point R will flip the circuit back and forth.

*One-shot.*—FIGURE 7, block L shows a one-shot that is used as an accurate timing device. When voltage is initially applied to the circuit, transistor Q1 is on due to the forward bias provided through resistor R4, and transistor Q2 is off due to the reverse bias provided through resistor R5. With transistor Q1 on, capacitor C1 charges from −20 volts to ground through resistor R6, resistor R3, and the base-emitter junction of transistor Q1. When capacitor C1 is fully charged, it has no effect on the state of the circuit as long as transistor Q1 is on. When a positive pulse comes in at point A it is passed by diode CR1 and turns off transistor Q1 provided the pulse has enough amplitude to override the −0.35-volt level present at the base.

When transistor Q1 goes off, its collector goes to approximately −19 volts. This potential is coupled to the base of transistor Q2 through the cross-coupling resistor R2, causing transistor Q2 to come on. Lead $\overline{Q1}$ goes to the base of a solenoid driver transistor. Transistor Q2 conducts through the base-emitter junction of the driver transistor to ground. With transistor Q2 on, the negative potential at its collector is switched common to its emitter and is present at the base of the solenoid driver transistor, causing it to go on. When transistor Q2 comes on, its collector approaches ground, thus referencing the charge on capacitor C1 to ground. The positive side of capacitor C1 is now +20 volts with respect to ground. Capacitor C1 now attempts to discharge and recharge to −20 volts through resistor R4 from the emitter-base junction of transistor Q2 and the emitter-base junction of the solenoid driver transistor. When the capacitor passes through zero potential and begins to accumulate a negative charge, it turns on transistor Q1.

When transistor Q1 conducts, its collector approaches ground, allowing the +5-volt bias through resistor R5 to turn off transistor Q2. The time involved for capacitor C1 to discharge to zero volts and to accumulate enough negative charge to turn on transistor Q1 is determined by the value of resistor R1 and the value of C1. This R–C time determines the duration of the output pulse on lead Q1.

*Counter or divider.*—FIGURE 7, block M shows a counter stage. It is also a divider stage when used to divide down the output of the keyboard frequency standard. When voltage is initially applied to this circuit, one of the transistors will conduct due to circuit value imbalance. Assuming transistor Q1 conducts, its collector is at −0.15 volt with respect to ground. This potential is present through resistor R2 at the anode of diode CR1. Since transistor Q2 is off, −10.5 volts is present at its collector and this potential is present through resistor R8 and at the anode of diode CR2.

When a positive pulse comes in at point S, it passes through capacitor C1 and capacitor C2. Since diode CR2 has a large negative potential at its anode, it blocks the pulse. Diode CR1 passes the positive pulse, provided the pulse is large enough to override the −0.15 volt present at the anode. In order to turn off transistor Q1, the pulse must also be of sufficient amplitude to override the −0.35-volt potential at the base of transistor Q1. When transistor Q1 turns off, its collector goes to approximately −10.5 volts due to the 1.5-volt drop across resistor R1. This 1.5-volt drop is due to the small current from −12 volts through resistor R1, resistor R3, and resistor R5 to +5 volts. The base of transistor Q2 is now at approximately −5.6 volts and therefore turns on. With transistor Q2 on, its collector is at −0.15 volt and the collector of transistor Q1 is at −10.5 volts. This minus voltage is present through resistor R2 and is at the anode of diode CR1. The −0.15 volt at the collector of transistor Q2 is present through resistor R8 and is at the anode of diode CR2.

The next positive pulse at point S will be blocked by diode CR1 and passed by diode CR2. Transistor Q2 now goes off and transistor Q1 comes on. Successive positive pulses at point S will trigger transistor Q1 and transistor Q2 alternately.

*Free-running multivibrator.*—FIGURE 7, block N shows an astable or free-running multivibrator that is used as a timing standard when extreme accuracy is not required. When the supply voltage is present and provided point A is at ground potential, the multivibrator will start to cycle. Component value tolerances are such that there will be an imbalance, enough such that one transistor will conduct first. Assuming transistor Q1 conducts first, capacitor C2 will charge through resistor R4 and the base-emitter junction of the transistor Q1. Capacitor C2 charges to the potential at the base of transistor Q1 which is approximately −0.35 volt with respect to ground. Since capacitor C1 has discharged any potential it may have accumulated, the negative potential through resistor R2 turns on transistor Q2. With transistor Q2 on, capacitor C1 charges through resistor R1 and the base-emitter junction of transistor Q2. Capacitor C2 is now discharging through resistor R3 and transistor Q2. Capacitor C1 charges to the potential at the base of transistor Q2 which is approximately −0.35 volt with respect to ground, allowing the negative potential through resistor R3 to turn on transistor Q1. This cycle repeats itself as long as voltage is applied and A is at ground potential. If ground potential is removed from A, transistor Q1 will be off and transistor Q2 will conduct until point A is returned to ground, allowing the cycle to continue.

*Emitter follower.*—FIGURE 7, block P shows an emitter follower circuit. Transistor Q1 is normally off due to the +5 volts reverse bias on its base. A logic 0 level applied to input lead A turns transistor Q1 on in series with a driving transistor in the following stage. (See the ribbon lift driver circuit on FIGURE 8A.) Since the emitter of transistor Q1 is now close to ground potential through the following stage, the output on lead T is actually negative-going (from +5 volts to 0 volt). Therefore, the circuit is an emitter follower in that a negative input produces a negative output.

PRINTER LOGIC

The logic diagram representing the operational functioning of the various electronic circuits of the printer is presented as FIGURES 8A and 8B which should be viewed as a single figure as this portion of the description proceeds.

*Tone and no tone detection.*—The purpose of the tone detector 166 (not per se a part of applicant's invention) is to detect the presence or absence of 1200-cycle tone on the incoming line. An incoming character consists of a series of seven equal time periods of no tone or tone. Normally the tone detector is part of the associated station equipment.

When the printer is to receive from a signal line, power supply relay K3–1 is operated and, through its contacts 6 and 1, connects the secondary winding of the line transformer T1 to the tone detector. Transformer T1 amplifies the tone normally present on the incoming line. The amplified tone is rectified by a diode and places a positive charge on a capacitor in the input circuit of transistor Q5. The positive charge keeps transistor Q5 off. The negative output level of transistor Q5 keeps transistor Q6 on. The positive output level of transistor Q6 keeps transistor Q2 in the space detector 168 normally off.

A change from continuous tone to no tone on the incoming line indicates a start pulse. The capacitor in the input circuit of the tone detector transistor Q5 dicharges, turning on transistor Q5. Transistor Q6 turns off and provides a negative transition into capacitor C105 to turn on NAND gate 1. NAND gate 1 inputs, marked $A_1B_0C_0$, are positive because this is the normal or zero position of the printer's 3-stage counter 170, so the NAND 1 gate is opened to start multivibrator MV1. The negative transition from transistor Q6 in tone detector 166 also turns on transistor Q2 in space detector 168 which provides a positive level at pedestal gate P7.

A change from no tone to tone on the incoming line results in tone detector transistor Q6 turning on again. The resultant positive transition turns off space detector transistor Q2 but has no effect on NAND gate 1; at least one of the other inputs of NAND 1 will be negative until the 3-stage counter 170, which was started by multivibrator MV1, returns to zero.

*Gating code elements 1–4 into first register.*—Detection of the character start pulse opens gate NAND 1, as just described, which supplies a positive level to free-running multivibrator MV1. This level allows MV1 to run as long as the level is present. When not running, MV1 has transistor Q26 on and Q25 off. The input level turns on transistor Q25, causing its base to go from negative 12 volts to about negative 0.35 volt. This positive transition feeds through one of the cross-coupling capacitors to the collector of transistor Q26, causing a momentary positive spike that shows as the initial output of the time base multi on the FIGURE 9 timing chart.

The initial positive spike from MV1 steps the 3-stage counter 170 once, turning stage A transistors Q28 off and Q27 on. Initially, the counter 170 resets in the $A_1B_0C_0$ condition, that is, stage A transistor Q28 on, stage B transistor Q46 on, and stage transistor Q63 on. It now changes to $A_0B_0C_0$ and remains so for half a cycle of MV1 which is designed to equal half the time of the start pulse. As transistor Q26 in MV1 turns off due to transistor Q25 turning on, the collector level of transistor Q26 goes negative until reversal occurs due to the cross coupling from the collector of transistor Q25 to the base of transistor Q26. Transistor Q26 then turns on again, causing its collector to go positive and step the 3-stage counter once again, this time from $A_0B_0C_0$ to $A_1B_1C_1$.

A full cycle of MV1 now occurs before transistor Q26 again goes positive to step the counter a third time, from $A_1B_1C_1$ to $A_0B_1C_1$. The gate AND 1 to stage 1 of the first register 172, opens as its input $A_0$ goes from negative to positive and provides a positive output level to pedestal gate P8. Similarly, each succeeding step of the 3-stage counter 170 causes a different successive AND gate in first register 172 to open (AND 2, AND 3, AND 4, and AND 5) and the preceding AND gate to close. Since the counter 170 steps each time MV1 cycles, and since MV1 is designed to cycle at the bit rate of the incoming line, a new AND gate will open in the middle of each code element. This delay in sampling each code element allows for phase errors in starting MV1 and for frequency errors in MV1.

For each code element that is a space, the space detector transistor Q2 provides a positive level to pedestal gate P7. Each positive output pulse from MV1 that finds P7 at a positive level, is raised enough by P7 to turn off transistor Q3. A capacitor in the input of transistor Q3 keeps K3 off long enough to assure that the 3-stage counter 170 will have stepped before transistor Q3 again turns on. In turning on, Q3 produces a positive transition that will set whichever stage of the first register 172 has been gated open by the counter 170.

Each of code elements 1, 2, 3 and 4 that is a space causes the corresponding stage of the first register 172 to be set. The fifth code element, if a space, can be gated directly through pedestal gates P–12 and P–65 into the fifth stage 2–5 of second register 174 which will be reset and therefore available before the fifth code element is detected. Thus a fifth stage on the first register 170 can be eliminated.

*Transferring a character into the second register.*—It is safe to reset the second register 174 as soon as the fifth code element of the incoming character has been detected. This is true because of a time relationship to how long it takes to print a character after it is shifted from the first register 172 into the second register 174. One indication that the fifth code element has been received is available on the 3-stage counter leads $A_0B_0C_1$. Note that all three go negative during receipt of the fourth code element. This sets up an OR condition such that as soon as any one goes positive, a positive pulse is available to reset the second register 174. Gate OR1 is the resultant circuit. An identical result is available from first register gate AND 5 when a positive output pulse is available when two inputs are positive and the third one goes positive.

The positive transition from gate OR1 resets the second register stages 2–1 through 2–5 via pedestal gates P52, P53, P54, P55, and P56. It also triggers a 1.2-millisecond (ms.) delay 290 via capacitor-input transistor Q60. Note that the slight delay introduced by transistor Q3 (between the space detector 168 and first register 170) is enough to assure that stage 2–5 of the second register 174 will be reset *before* it is set by the output pulse of Q3. After 1.2 ms., the positive transition from delay 290 resets the four stages 1–1 through 1–4 of the first register 172. Those stages of the first register 172 which are set to register spaces now emit positive pulses from their 0 side, thereby setting the corresponding stages of the second register 174. In this manner the coded character is transferred from the first to the second register.

The positive transition from the 1.2 ms. delay 290 also sets a flip-flop register 292 called 2ND. This 2ND register 292 in the set condition indicates that a character is stored in the second register 174, information that is vital during automatic carriage return as discussed more fully hereinafter.

Further, the positive transition from 1.2 ms. delay 290 through a branch output to pedestal gate P1, steps the counter 170 from the $A_0B_1C_0$ condition to the $A_1B_0C_0$ condition to perform the eighth step and thereby get the counter 170 back to zero. A few milliseconds later the stop pulse of the incoming character is detected, thus causing the fourth input to the time base gate NAND1 to go positive, closing it and thereby turning off multivibrator MV1.

*Transferring a character into the third register 176.*—As soon as the second register 174 is set, gate NOR1 (upper right-hand corner of FIGURE 8B) resets the third register 176 and triggers the 840$\mu$ sec delay circuit provided by MV2 transistor Q81. Gate NOR1 provides a positive-going output transition when one input is negative and the second input goes negative. Except in automatic carriage return conditions, the input to gate NOR1, from the register 294 called 3RD, is always negative by the time a new character is ready to be stored in the third register group 176. When gate NOR1 turns on, the positive output pulse (a) resets the third register group via pedestal gates P47 through P51, and (b) turns off the MV2 delay transistor Q81. A capacitor in the input to transistor Q81 keeps transistor Q81 off long enough to allow resetting of the third register 176. When transistor Q81 turns back on, the output pulse triggers gates P13 through P17 to gate the elements of the code characters from the second register 174 into the third register 176.

The positive-going transition from MV2 transistor Q81 that sets the third register 176 also resets the 2ND and 3RD registers 292 and 294. Gate NOR1 is closed (turned off) by whichever of the two registers, 292 and 294 flips first to produce a positive level on its 0 side.

*Setting the go-ahead index.*—The positive-going transition from MV2 transistor Q81 that sets the third register 176, through a branch circuit also sets the go-ahead index register 192 (see lefthand center of FIGURE 8A). With the register 192 set, the mechanically-generated induction index pulses from type-drum monitor heads 186 or 184 can now be used to reset the go-ahead index register 192 and thereby trigger the next operation. The pulses from monitor heads 186 and 184 are always available whether or not a character has been received into the registers 172, 174 and 176.

*Letters and figures selection.*—In any signaling system that uses the Baudot code, two of the possible 32 codes are used to shift the receiving device respectively from letters to figures and from figures to letters. In the present set 100 a case register 296 (lower left of FIGURE 8A) keeps track of the last shift character code received. Before any incoming character is printed, the case register 296 is checked to determine whether the received code represents a letter or a figure.

The condition of the case register 296 (transistors Q73 and Q74) allows one or the other of diodes CR155 or CR156 to respectively pass either a letters clock pulse from drum monitor 186 or a figures clock pulse from monitor 184 (see FIGURES 10, 14 and 15). Return to FIGURE 8. If a letters shift character was the last shift character received, the case register 296 is in the logic 1 state, diode CR154 is back biased to block figures clock pulses from monitor 184, and diode CR155 is forward biased to pass letters clock pulses from monitor 186.

FIGURE 10 shows that the letters A, B, C, etc., are placed on one-half of the type drum in binary order, and that the digits 1, 2, 3, etc., the punctuation marks and other symbols are placed in binary order on the second half of the wheel. Considering FIGURES 8 and 10, the letters clock pulse is supplied to amplifier transistor Q90 sixteen (16) characters or 90° before the first letter (E) on the type drum passes in front of the print hammer. Similarly, the figures clock pulse is supplied to its amplifier transistor Q88 sixteen (16) characters or 90° before the first figure (3) on the type drum passes in front of the print hammer. Triggering from these LTRS or FIGS monitor pulses instead of 16 counts later from the index pulse allows a desired time period for completely lifting the printing ribbon into the printing position.

Whichever monitor pulse (LTRS or FIGS) is allowed by case register 296 to pass through diode CR154 or CR155 resets the go-ahead index register 192 to start ribbon lifting and to fill the 5-stage counter 178 with the character waiting in the third register 176.

When either the letters shift character or the figures shift character code is received, the case OR gate OR2 has all inputs at logic 0, thereby providing a logic 0 level output that provides a forward bias for diode CR115. When the go-ahead index register 192 is reset by a letters or figures clock pulse, as has been just described, a positive pulse from the 0 output of the go-ahead index register 192 passes through diode CR115 to set or reset the case register 296. If the stored character is the letters shift function, the positive level on lead $3_1$ allows pedestal gate P23 to pass the pulse from diode CR115 to the set side of the case register 296. But if the stored character is the figures shift function, the positive level on lead $3_0$ allows pedestal gate P24 to pass the pulse from diode CR115 to the reset side of the case register 296.

The LTR and FIG pushbutton switches 298 and 300 art located on the front panel (FIGURE 1) and provides means for the case register 296 to be set and reset manually. When depressed, the LTR pushbutton switch 298 sets the case register. The FIG pushbutton switch 300 resets the case register.

*Advancing the count in the 5-stage counter 178.*—When a letter is to be printed, the pulse from letters clock monitor head 186 resets the go-ahead index register 192. This causes a positive-going transition on the 0 output side of the go-ahead register 192. Gate P21 allows the positive transition to set the go-ahead count register 196.

A positive level on the 1 output side of the go-ahead count register 196 turns off transistor Q76. The negative level on the collector of ribbon lift amplifier 197 transistor Q75 turns on emitter follower transistor Q76. High power driver transistor Q6 for the ribbon lift turns on from the negative-going transition at the emitter of transistor Q76. Collector current of the power transistor Q6 flows through the ribbon lift solenoid 198, energizing it and starting the ribbon lift operation.

The positive-going transistion on the 1 output side of the go-ahead count register 196 also sets the fill-counter register 190 through pedestal gate P71. The positive-going transition on the 1 side of the fill-counter register sets a count into the printer 5-stage counter 178 through pedestal gates P26 through P30.

The first four stages (A through D) of the 5-stage counter 178 are connected to the logic 1 or spaced side of the corresponding stages of the third register 176. The fifth stage E of the 5-stage counter 178 is connected to the logic 0 or mark side of the fifth stage of the third register 176. Reversing the wiring thusly for the fifth bit from the third register changes the count that would otherwise be set into the counter 178 and thereby compensates for the fact that the counter 178 is started 16 counts before the printer is ready for letters or figures to be printed. The exact count that is set into the counter 178 for any given character is the sum of the position values (that is, 1, 2, 4, 8 and 16) assigned to the counter stages A, B, C, D and E that receive logic 1 from the third register 176. For example, the letter E in Baudot is 10000 (see FIGURE 10). The second, third, fourth, and fifth bits are spaces and therefore cause the second, third, and fourth stages B, C and D of the counter 178 to be set. The wiring reversal prevents the fifth stage E from being set. This represents a count of 2 plus 4 plus 8, or 14 counts. With the counter already advanced 14 counts when countdown starts, the next 16 counts produced by the pulse-per-character clock monitor head 180 advance the counter to position 30 or two counts short of the end of count. Printing occurs at the end of countdown which in the case of an E is two counts after the ready index pulse from monitor head 182 occurs.

*Countdown finish before index pulse.*—Printing is triggered by pedestal gate P41 (right center of FIGURE 8A) from a level set by the index pulse clock 182 and from a pulse supplied by the five-stage counter 178 at the end of countdown. If countdown in counter 178 ends before the index pulse from head 182 resets the fill-counter register 190, the end-of-countdown pulse cannot open gate P41, and printing is delayed for an additional 32 counts during which time an index pulse from monitor head 182 will have been received. Printing must, of course, not occur before the first 16 counts because the letters half of the drum will not yet be in the printing position.

Countdown of the 5-stage printer counter 178 will start over if printing cannot occur at the end of the first countdown due to lack of an index pulse to the fill-counter 190. Since the printer counter 178 has five stages, it will take 32 additional counts to count down completely to again pulse and this time open the gate P41.

*Printing.*—A 1.1 ms. print one-shot 199 is used to control the print solenoid 200 since it is necessary that the hammer strike the ribbon for only a limited period. When the index pulse from head 182 occurs before finish of countdown, it resets the fill-counter register 190 to arm a gate P41. The next completed countdown will trigger the gate P41 to reset the go-ahead count register 196. The resultant positive-going transition on the 0 side of the register triggers the printing one-shot 199 (Q39, Q40). The resultant negative level on the 1 side of the go-ahead count register 196 closes gate P25 to the 5-stage counter 178 to stop the counter, and turns on ribbon lift amplifier transistor Q75 to start deenergizing the ribbon-lift solenoid 198. The printing one-shot 199, while activated, energizes the print solenoid 200. A potentiometer placed in the one-shot circuit will permit the on-time of the one-shot 199 to be varied to vary the hue or blackness of the printed character.

*Spacing.*—When the printing one-shot 199 turns on, it triggers a 9 ms. spacing one-shot 202 in addition to energizing the print solenoid 200. By the time the spacing solenoid 204 becomes energized, the printing operation is completed. Therefore, after any character is printed, the print hammer carriage is moved one space to the right in preparation for the next character. See detailed description hereinafter under "Printer Mechanism" for an explanation of how the spacing mechanism operates.

*Printing after automatic carriage return.*—As the print hammer carriage moves from position 71 to 72 (for communications printers) an automatic carriage return and line feed switch 206 closes, providing a positive input level for a pedestal gate P78. The next printing character received will be printed in carriage position 72, and the 9 ms. space one-shot 202 will be triggered. In position 72, the carriage is against a mechanical stop and therefore cannot be moved further to the right, so for circuit simplicity, the space one-shot 202 is permitted to trigger anyway. After the 9 ms. of the delay (see FIGURE 11), both the carriage return and line feed one-shots 302 and 304, respectively, are triggered to initiate simultaneous carriage return and line fed operation. Line feed accompanies carriage return automatically only when *automatic* carriage return is necessary. If the distant operator sends a normal carriage return signal but does not follow it with a line feed signal, the next line will overprint. This feature allows the operator to cross out a line.

With CR–LF switch 206 closed, the triggering pulse through gate P78 sets the line feed one-shot 304 (transistors Q58, Q59) which in turn through power transistor Q2 energizes a line feed solenoid 306. This feeds the record page one line, as will be hereinafter described.

The ACR triggering pulse through gate P78 also sets the carriage return one-shot 302 (transistors Q41, Q42) which in turn, through power transistor Q3, energizes a carriage return solenoid 308. While the CR one-shot 302 is on, the negative level of the 0 side blocks gate P20 to the go-ahead index 192 to prevent printing.

*Character storage during automatic carriage return.*—If the sending station continues to transmit while the print hammer carriage is being returned to the left margin, additional characters must be stored by the printer. The amount of storage depends on the highest line speed (10.7 characters per second) and the time required to return the carriage (115 milliseconds). One register is sufficient in addition to the two registers required normally.

FIGURE 11 timing chart shows automatic carriage return occurring during a sequence of E's and V's. The letters E and V are farthest apart on the print wheel and therefore provide the worst-case example.

When printing is not delayed because of automatic carriage return, the third register 176 is filled immediately after the second register 174 is filled. When the third register 176 cannot be cleared as soon as a character is registered in the second register 174, the negative level on the 0 side of the carriage return one-shot 302 blocks gate P20 and prevents letters or figures clock pulses from resetting the go-ahead index register 192. In FIGURE 11, the third register is shown being cleared immediately before automatic carriage return, and is shown holding a character during and after automatic carriage return. Note that the first and second registers keep functioning in the usual way since they must follow the incoming line regardless of what the printer is doing.

The first letters clock pulse that occurs *after* automatic carriage return has been completed, resets the go-ahead index register 192. The resultant positive-going transition on the 0 side of the go-ahead index register 192 starts the printing cycle and, after a 0.5 ms. delay in transistor Q43, sets the 3RD register 294 (see top right corner of FIGURE 8B). This delay allows time to set the 5-stage counter 178 with the new character before resetting the third register 176. Since in this example a character (V) is waiting in the second register 174, the 2ND register 292 is also set, and gate NOR1 opens to trigger 840$\mu$ sec. delay multivibrator MV2 (transistor Q81) and to reset the third register. After the 840$\mu$ sec. delay introduced by transistor Q81, the third register 176 is set with the character (V) stored in the second register 174.

In the example shown in FIGURE 11, the printer catches up on the fifth character (E) after the last character printed in the upper line. An indication of "catching up" is that the third register can be set as soon as the second register receives a new character.

*Machine function characters. Detecting machine functions.*—Characters that do not require printing are detected individually by OR gates OR2 (case shift), OR5 (bell), OR11 (blank), OR12 (space), OR13 (carriage return), and OR14 (line feed). Any one of these machine functions causes print strobe gate NAND2 to inhibit the printing cycle at pedestal gate P21 to the go-ahead count register 196. For circuit simplicity, the machine function cycle is started by a letters or figures index pulse in the same way that the printing cycle is started.

*Figures shift and letters down shift.*—The codes for figures shift and letters shift differ only in the third code bit (see FIGURES 2 and 10). A single case shift gate (OR2) is used to predetect either code as far as code elements one, two, four, and five are concerned. The output of gate OR2 connects to inhibit-print gate NAND3, and also to the case register 296 via gates P23 and P24. The figures shift function *sets* the case register 296, while the letters shift function *resets* the case register 296. One input to bell detector gate OR5 is the 1 side of the case register to prevent the letter S from looking like a bell function. The index pulse that sets or resets the case register 296 is the letters pulse when a figures shift function is detected, and is the figures pulse when a letters shift function is detected.

*Bell.*—The code for bell (upper case S) is detected by gate OR5. Its output provides a forward bias for diode CR128 to permit the index pulse from go-ahead index register 192 to trigger the 14 ms. bell one-shot 310 and thereby energize bell solenoid 312 to cause a bell to be rung momentarily. The output of bell detector gate OR5 also connects to inhibit gate NAND2 to inhibit printing of pedestal gate P21.

*Blank.*—The code for blank (00000) is detected by gate OR11. Its output connects to print inhibit gate NAND2 to inhibit printing at pedestal gate P21.

*Space.*—The code for space (00100) is detected by gate OR12. Its output connects to print inhibit gate NAND2 to inhibit printing at pedestal gate P21 and also provides forward bias on diode CR29 to permit the go-ahead index pulse to trigger the auxiliary space 19 ms. delay one-shot 314 (transistors Q21, Q22). A 19 ms. delay is required after gate P43 to insure completion of the space-after-printing operation before the space solenoid 204 is again required to operate from the space function. The worst case would be a space following a V, since V is the last letter on the letters half of the type drum. After the delay, the auxiliary space one-shot 314 is triggered through pedestal gate P73.

*Carriage return.*—The code for carriage return (01000) is detected by gate OR13. Its output connects to print inhibit gate NAND2 to inhibit printing at pedestal gate P21 and also provides forward bias on a diode CR57 to permit the index pulse to trigger the 115 ms. carriage return one-shot 302 and thereby cause the carriage to be returned to the lefthand margin. A carriage return manual switch 316 on panel 126 pulses a pedestal gate P75 to trigger the carriage return one-shot 302 and causes immediate carriage return.

*Line feed.*—The code for line feed (00010) is detected by gate OR14. Its output connects to print inhibit gate NAND2 to inhibit printing at pedestal gate P21. The output of line feed detector gate OR14 also provides forward bias on a diode CR87 to permit the index pulse to trigger the line feed one-shot 304 and thereby cause the paper to be fed to the next line. A manual line feed switch button 318 on drawer front panel 126 permits pulsing of line feed one-shot 304 to manually line feed.

PRINTER MECHANICS

FIGURE 12 will provide an over-all picture of the mechanical components of the type drum page printer 102 and the positional relationships of the components to each other.

In general terms, the drum 704 includes, on its cylindrical periphery, a plurality of different lines of identical information symbols, 72 identical symbols (76 for a weather drum) constituting one line extending along the cylindrical drum periphery parallel to the drum axis. The drum is continuously rotated by a printer motor B1 and is directly connected with a drum position clock wheel 706 to enable determination of the passage of each distinct line of type past a print station line by related printer electronics which have been hereinbefore described relative to the printer logic diagram FIGURE 8. A plug hammer carriage 708 can be spaced across in front of the drum surface, parallel to the drum axis, by an escapement spacing mechanism actuated by spacing solenoid 204 at the right hand side plate. The carriage 708 is returned by a carriage return mechanism 710, seen at the lefthand side of FIGURE 12, which is activated by the carriage return solenoid 308. Power for carriage return is derived through a clutch device driven by the printer motor B1.

A sheet paper, strip record medium is supplied from a paper roll 712 mounted between the frame end plates, to the rear of drum 704, the paper feeding over suitable guide devices (not shown), under and up past the front of the drum, passing between the drum 704 and the print hammer carriage 708 and under two, side edge guide fingers 713, one being shown in FIGURE 13. The paper 712 then passes on out of a slot 714 (see FIGURE 1) in the Unit 1 cover formed behind a clear Lucite window 715. Paper feed is accomplished by two, solenoid stepped, pressure rolls under the drum which press the paper against two feed wheels at the ends of the print drum.

An ink ribbon 716 passes across the drum face parallel to the drum between the print hammer and the paper to transfer the typed impression from the drum to the page during a print operation. The ink ribbon assembly feed and reverse mechanism is conventional and will be only briefly described hereinafter. However, the ink ribbon 716 in this printer is rigid to always pass in a straight stretch across the front of the drum 704 parallel to the character spacing path of the print hammer, and the entire straight front stretch of the ink ribbon is lifted to a position in front of the hammer just prior to a printing action. Accordingly, the mechanism to accomplish ribbon lift is considered unique and will be hereinafter described in detail.

As shown in FIGURE 12, the printer components are mounted on a support structure including a thick base plate 718 having a slotted center bar 719 passing laterally from one side of the printer to the other and under the path of travel of the print hammer carriage. Two vertical side plates 720 and 721 are rigidly secured to the base plate 718 and provide the mounting structure for most of the printer components. The printer base plate 719 is secured to threaded studs on the drawer 113 and the major portion of the transistorized printer electronics are mounted on a large printed circuit board secured on the underside of drawer 113.

DRUM ASSEMBLY

Referring now to FIGURE 13 (also FIGURES 16–18), the print drum 704 is pre-assembled in an inexpensive manner as compared with previously known drums for type drum printers which were engraved from solid materials. (Cost of the fabricated type wheel drum of the present invention is approximately 1/50 that of an engraved drum.) The drum 704 is fabricated from a plurality of double row type wheels 722, manufactured to a very close tolerances, mounted, indexed and clamped on a drum shaft 723 in a manner now to be described.

As dipicted in FIGURES 16–18, each type wheel 722 is made from a suitable high strength material capable of withstanding multiple print hammer blows and maintaining true circular shape under continual rotation. Steel, other presently known high strength metals and some plastics can be used. The wheel 722 has a central, disc shaped, thin web 724 apertured with lightening holes 725, an indexing hole 726 and balance holes 727 and 728.

The rim 730 of each type wheel 722 provides a peripheral T-flange carrying two axially spaced apart rows of raised printing symbols, such as letters, numbers, punctuation, etc., each pair of side by side raised symbols being identical and disposed with their center lines extremely accurately equidistant from the web center plane and also accurately equidistant from the nearest adjacent edge of the rim 730, as shown by representative actual values on FIGURE 18. The edges of rim 730 are flat and are accurately disposed in parallel planes normal to the wheel axis. As clearly depicted in FIGURE 18, the true axial dimension of the rim T-flange 730 is 0.2000″ which is the distance of space required for two standard teletypewriting symbols, and this dimension is held to an extremely close tolerance range of ±0.0005″. This tolerance value is necessitated to prevent a build-up of a 72 character line, space error in an assembled drum. If the center line spacing of each of the two rows of characters is maintained within tolerances of ±0.003″ the overall character space tolerance of each character relative to adjacent characters and of the entire line of characters will be well within the acceptable limits.

The five-unit Baudot code permits of thirty-two different code bit combinations and, using letters and figures shift functions, sixty-four characters can be realized. Accordingly, in the exemplary printer, sixty-four positions (see FIGURE 10) are provided around the periphery of each type wheel rim 730 and all characters are accurately located at specific angular positions. A layout portion of a wheel rim is seen in FIGURE 17.

To assure that all wheels 722 are assembled in proper indexed alignment with the adjacent wheel, an index slot 706 is made in the web 724 of each wheel, the slot center line being aligned with one and the same specific character on all wheels. The web center holes 731 of all webs are also accurately located and is dimensioned to provide a smooth guided coaxial fit on the drum shaft 723. By means of a suitable jig, the index slots 726 are aligned before and during torqueing of the drum assembly into clamped assembly, as will be now described.

Going back to FIGURE 13, an intermediate length 733 of drum shaft 723 is dimensioned to fit the center holes 731 of the type wheels 722. Both ends of the intermediate shaft section 733 are threaded as indicated at 734. A suitable number of wheels 722 (36 or 38) are placed on the shaft 723, indexed to align the same characters on all wheels and clamped together by two end clamping plates 735, adjacent spacers 736 and nuts 737, the latter being threaded and torqued very tightly on the threaded ends of the intermediate shaft section 733. (Note: With 38 wheels, the spacers 736 are omitted.) The center holes 738 of clamp plates 735 are the same size as the type wheel center holes 731 and also have a smooth coaxially locating fit on drum shaft intermediate portion 723. The outer periphery of each clamp plate 735 is provided with a right angled annular flange 737 which faces the stack of type-wheels and fits with a slight radial clearance within the external flange of the rim T-flange 730 of the adjacent type wheel 722, abutting the wheel web 724 in annular contact. This fit transfers an even annular clamping pressure to the outer periphery of each of the end type wheels of the assembled drum 704 and thus, the clamping pressure is evenly transferred through the flat abutting rim edges of all adjacent typewheels 722. This clamping pressure is all that is required to hold all typewheels in true indexed alignment. Both sets of clamping plates 735, spacers 736 and nuts 737 are locked together, after the clamping pressure is achieved, by a roll pin 740.

A left hand bearing retainer assembly 742, which carries a bearing 743 in a socket 744, is placed over the left hand reduced diameter end 745 of the drum shaft 723 with the inner race of the bearing 743 against a shoulder 746 formed between the shaft end 745 and the shaft intermediate section 733. A somewhat similar right hand bearing retainer assembly 747 and shaft bearing are placed over a right hand reduced end portion 776 of the drum shaft 723. Right hand bearing assembly 747, as clearly shown in FIGURE 14, includes an integral clock head mounting plate 748, which serves to rigidly mount the printer clock monitor heads 180, 182, 184 and 186, in the position diagrammatically illustrated in FIGURE 15.

Before the hubs 749 and 750 of respective bearing retainers 742 and 747 are clamped in sockets on respective printer frame end plates 720 and 721 by clamping blocks 751 and 752, left and right hand record medium feed wheels 753 and 754, with associated ring gears 755 and 756, are placed on external bushing sleeves 757 and 758 integral with the associated bearing retainers. The feed wheel gears 755, 756, are clamped to the respective feed wheels 753 and 754 by screws and split, annular ring clamping plates 759 which fit into and ride in grooves 760 in the bearing retainer body (see FIGURE 14) to axially maintain the feed wheels 753 and 754 in position adjacent each end of the drum 704.

A rubber O-ring 761 is stretched over the periphery of each feed wheel 753, 754 and fitted into half circle grooves 762 in the periphery of its feed wheel, and then cut or ground down almost even with the feed wheel periphery to serve as a friction band to engage and line feed the page record medium, by means to be hereinafter described. If desired, the O-ring 761 may be cemented in the groove 762 but it is not necessary. Note, the feed wheels are now rotatably mounted on the bearing retainers which will be clamped in adjacent printer frame end plates 720 and 721 and the drum 704 is rotatably mounted relative to the bearing retainers, completely independent of the record feed wheels 753 and 754.

Drum drive.—Assembled in the frame, as seen in FIGURE 13, the left hand drum shaft end 745 projects beyond the bearing retainer 742 and a gear 770 is non-rotatably secured thereto by set screws 771. Shown in FIGURE 12, the printer motor B1 is mounted on the inside of frame plate 720 with its shaft 772 projected through the plate and carrying a drive gear 773. A gear tooth drive belt 774 meshes with motor gear 773, drum gear 770 and a carriage return clutch input gear 775 (see FIGURE 27) and when the printer motor B1 is energized, by power relay K2–1 (see FIGURE 5), the drum 704 will continually rotate.

The clock wheel 706 is non-rotatably secured to the right hand drum shaft end 776, and has peripheral reference notches 777 properly located relative to the angular positions of the print characters on the drum 704 and the letters and figures notch 778 located at the 180° division line between the separate groups of letters and figures on the drum 704 (see FIGURE 10). The two index notches 779 and 780 are located radially within the path of notch 778, 180° apart on the clock wheel (notch 779 running into notch 778) and the positioning of the monitor heads 180, 182, 184 and 186 will provide indexing signals 90°, sixteen (16) characters, ahead of the go-ahead letters or figures pulse to permit the requisite time lapse to operate the ribbon lift, as has been described hereinbefore.

The clock wheel 706 rotates with the print drum 704 and as it rotates, the moving notches vary the reluctance of bar type magnets located in the clock monitor head coils 180–186 inducing appropriate current pulses into associated transistor amplifiers, as described hereinbefore relative to the FIGURE 8 printer logic diagram.

INK RIBBON LIFT

The normal position of the front printing stretch of the ink ribbon 716 is below the printing line, in order not to obscure the line of printing. Accordingly, the ink ribbon must be raised and lowered to accomplish printing of each character.

Referring to FIGURES 20 and 21, the ribbon 716 is held in position by right and left ribbon lifter arms 782 and 784, and is raised and lowered through the action of ribbon lift solenoid 198 and the solenoid plunger spring 785. The ribbon lift solenoid, secured on the right side of plate 721 of the printer frame, when energized, pulls its plunger 786 down into the coil. A solenoid link 787 attached to plunger 786 and a lifter lever 787 rocks the right ribbon arm bracket 789 clockwise around its pivot axis, the pivot being provided by a long ribbon lift shaft 790 passing through and journalled in both of the printer side plates 720 and 721. Lift shaft 790, being non-rotatably secured to the right arm 789, rotates in its bearings, transferring the lifting action to the left side of the printer and a left ribbon arm bracket 791, which is clamped to the ribbon lift shaft and rocks conjointly with the right arm bracket 189. The ends of each ribbon lifter arm carry a ribbon guide roller 792 and a ribbon retainer 793. Both the right and left sides of the front stretch of the ink ribbon 716 are raised simultaneously through action of this mechanism.

Bumpers 794 and 795, mounted on brackets 796 and 797 secured to and projecting from the printer side plates 720 and 721, are provided to be engaged by the studs which journal the ribbon guide rollers 792 in the ends of the lift arms, and prevent an overthrow of the ink ribbon when it is lifted. The return of the ink ribbon 716 to its normal rest position is accomplished through the de-energizing of the ribbon lift solenoid 198 and the action of the solenoid plunger spring 785. The upward travel is effectively limited by the solenoid plunger 786 bottoming in the ribbon lift solenoid. The downward travel of the ink ribbon 716 is limited by abutment of the right ribbon lifter arm bracket 789 against an adjustable eccentric pin 798 on the side plate 721.

LINE FEED

Referring to FIGURES 13 and 19, the paper 712' is fed through the printer from a roll 712, one line at a time by the action of the line feed mechanism. The paper can be held in a given position or can be fed one line at a time by a line feed detent wheel 800 secured on the right hand end of a feed shaft 801 rotatably mounted in the frame plates 720 and 721, parallel to the drum axis and passing under the drum 704.

To keep the paper from feeding during printing, the detent wheel 800 is held by line feed detent 802. During line feed, the detent wheel 800 is turned one space by a line feed pawl 803. A line feed pawl bail 804, on which the line feed pawl is mounted, pivots about the line feed shaft 801. Moving the lower end of the line feed pawl bail 804 toward the rear of the printer causes the line feed pawl 803 to overcome the detent action of the line feed detent and the paper will be fed one space. The line feed pawl bail 804 is attached to feed solenoid plunger 805 and is actuated when line feed solenoid 306 is energized, pulling the solenoid plunger 805 into the coil.

Mounted on the line feed shaft 802 are two paper feed wheel driving gears 806 and 807 (see FIGURE 13). Rotation of the shaft 802 and the two paper feed driving gears which mesh with the two paper feed driven ring gears 755 and 756 on the large paper feed wheels 753 and 754, rotates the two paper feed wheels in a conjoint line feed movement.

The paper 712' is held against the two paper feed wheels 753 and 754 by two pressure rollers 808 and 809. The two pressure rollers 808 and 809 are mounted on flat springs 810 and 811 which are mounted to a pressure roller release shaft 812. Attached to the pressure roller release shaft 812 is a pressure release lever 813. When pressure release lever 813 is moved to the rear of the printer and secured by a latch plate 814, the pressure roller release shaft is rocked to move the pressure rollers 808 and 809 into spring biased engagement with the paper, holding the paper tight against the high friction rubber paper feed wheel bands 761, to enable controlled line feeding of the paper. The pressure release lever 813 in a released position will allow the operator to insert paper into the printer.

INK RIBBON FEED

Referring to FIGURE 12, whenever motor B1 is operating, the ink ribbon 716 is pulled continuously through the ribbon guides 793 on lift arms 782 and 784 to provide uniformly printed impressions. Power to feed the ink ribbon is obtained from drive belt 774 rotating a ribbon feed cam (not shown). A conventional ribbon feedpawl 815 moves up and down, rotating a ribbon shaft driving ratchet 816. Rotating the ribbon shaft driving ratchet will rotate the ribbon spool drive shaft 817. The ribbon spool drive shaft can be moved to the right or left by conventional shifting mechanism, and only one ribbon spool shaft drive clutch is engaged at a time. As one ribbon spool 818 becomes empty, the drive automatically reverses to it from the other ribbon spool 819 and vice versa.

PRINT HAMMER

Referring to FIGURES 22–24, selecting of the proper character is done electronically but the actual printing of the character is done mechanically with the print hammer mechanism on carriage 708.

Referring to FIGURE 24, the lower front face *825a* of print hammer block 825 is stepped forward a slight amount to provide a blocking abutment for a hammer armature 820. The hammer 822 is preferably steel but may be made from other suitable material with similar weight and elastic rebound characteristics. Its shaft is mounted through the two holes in the print hammer block 825 with the armature impact end *822a* projecting forward a sufficient distance to extend approximately 0.015" beyond the face of the blocking abutment *825a*, being so limited by the ring clip *824b* fixed in the hammer shaft groove *822b*.

When the proper character is selected, print solenoid 200, carried on carriage 708, energizes, pulling the pivotally mounted print armature 820, against the bias of its spring, toward the solenoid core. The forward motion of the print armature 820 is stopped by its engagement with the blocking abutment *825a* on the hammer block 825, just after 0.015" it hits the end *822a* of print hammer 822. The impact momentum of the print hammer 822 carries it forward, pressing the ribbon 716 and paper 712 against the proper raised, rotating symbol on the drum to print the character. The start of de-energizing of the print occurs before the armature hits the abutment *825a*, thus allowing the print armature 820 to rebound to its normal rest position against backstop plate 823. The print hammer 822 has an extremely rapid stroke with elastic rebound, after striking the drum, back to its normal rest position, aided slightly by small coil spring 824, which is placed over the hammer shaft between the end members of the hammer block between the rear block face and the clip ring *824b*. A felt oil ring *824a*, spring 824 and clip *824b* with the hammer 822 in a print hammer block 825, the block being secured in a recess in the carriage body 826 by the carriage bracket plate 821.

Shown in FIGURES 22 and 23 a ribbon guide 861 is clamped on the rear of carriage 708 and supports the stretch of ink ribbon 716 at a position in front of the print hammer.

SPACE

Still referring to FIGURES 22 and 23 and also referring to FIGURES 25 and 26, in order to prevent characters from being printed on top of one another, carriage 708 must be moved one letter space to the right each time a character is printed or a space function is received. The upper portion of the carriage body 826 has a through bore which carries slide bushings and rides on a carriage rail 827. An eccentrically, adjustably mounted bottom carriage roller 828 rides between guide rails 829 and 830 which are fastened to the frame center bar 719. The carriage is driven by a conventional carriage drive spring in a spring drum 831 (see FIGURE 26) through the medium of a spacing belt 832. Drum 831 is mounted on the outside of the right hand printer frame plate 721.

The carriage 708 is spaced and held in place by the action of a space pawl unit 853, carried on the front of carriage body 826, in controlled, engaging co-operation with a ratchet toothed space rack 834. The space pawl 833 is actually an escapement mechanism operated by a space bail 835 secured on a pivotally mounted square shaft 836 journalled across the front of the printer in frame plates 720 and 721. The space bail 835 is actuated in a rocking movement for each space actuation by the space solenoid assembly 204 (see FIGURE 25).

Each time the space solenoid 204 is energized, its armature 837 is pulled against the solenoid core. Movement of an attached forked adjusting arm 838 on armature 837, through cooperation with a pin 839 in shaft 836, rotates the space bail 835 downwardly, forcing the right-hand lug portion 840 (see FIGURE 22) of the space pawl 833 out of engagement with a tooth on the space rack 834. Forcing the right portion 840 of the space pawl down out of engagement with the rack 834 exerts a spring tension force by space escapement spring 841 on the left portion 842 (see FIGURE 22) of the space pawl. When the right portion 840 of the space pawl is pulled out of engagement with a rack tooth it allows the carriage drive spring drum 831 to move the print carriage 708 approximately one-half of a space toward the right. The spring tension placed on the left portion 842 of the space pawl, moves it up to engage a tooth of the space rack 834, stopping movement of the carriage at a one-half space position. Upon release of the space armature 837, by de-energizing, the space bail 835 is spring biased to return to its normal position, releasing the right lug portion 840 of the space pawl 833. Due to the shape of the space pawl, its left portion 842 is now forced out of engagement with a tooth of the space rack, allowing the carriage 708 to complete its full space move to the right. The right lug portion 840 now has moved up to engage a tooth on the space rack 834 stopping the carriage 708 and completing the spacing cycle.

CARRIAGE RETURN

The major mechanical aspects of the carriage return mechanism are disclosed in FIGURES 28 and 29 with details seen in FIGURES 12, 27 and 30–34. The mechanism to accomplish carriage return may be actuated in two ways; one, by receipt of a coded carriage return character, and two, by actuation of an automatic carriage return switch 206, shown in FIGURE 12, secured to the front edge of the frame center bar 719. Switch 206 is operated after the carriage 708 has spaced to the right for printing of the 72nd (76th weather) character, at which position the carriage mounted, depending eccentric guide roller 828 is at the end of its track 829, 830 and has engaged and moved a dog leg switch lever 850 which depresses the actuator pin 851 of automatic carriage return switch 206. The switch lever 850 and its mounting bracket act as a positive stop for the carriage 708 and prevent further spacing movement on printers where the automatic carriage return feature is not used and has been intentionally disabled.

Upon receipt of a coded carriage return character signal by the printer electronics, or upon operation of the automatic carriage return switch 206, the printer electronics section, among other actions which have herein-before been described, energizes the carriage return solenoid 308 which, as shown in FIGURES 27 and 28, is mounted on an auxiliary bracket 852 secured to the left-hand printer frame plate 720. Energized, the solenoid 308 pulls its plunger 854 into the coil, and the plunger, through an adjustable link 856, pulls on one arm 858 of a carriage return pivot lever 860, rotating the return lever 860 (FIGURE 29) clockwise around its pivot post 862. The pivot post 862 is fixed in a carriage return bracket assembly 864, portions being shown in FIGURE 29, securely mounted on the left hand frame plate 720.

The other arm 866 of the return pivot lever 860 pivotally carries a carriage return latch 867, which has a notched latching arm 868 and a bent tab release arm 869. The notch in arm 868 of latch 867, being latched on a tab 870 at the end of a central lever arm 871 on a channel shaped clutch actuating lever 872, rotates the main lever 872 clockwise on its pivot post 873 which is fixed in the bracket 864.

This motion of clutch lever 872 moves a carriage return clutch pulley drum 876 into positive clutching engagement with the driving member 877 (see FIGURE 31) of a carriage return clutch 880. Drive member 877 is rotated through a disc friction clutch 881 by clutch gear 775 meshed with the motor drive belt 774 and, when the clutch 880 is engaged, winds a carriage return belt 882 on the pulley drum 876. Return belt 882 is attached to, and pulls the carriage 708 on its tracks toward the left side of the printer.

As the center arm 871 of the channel shaped clutch actuating lever 872 rotates, it engages and, through a depending tab 883, shifts a rack lift pivot arm 884 which is also pivoted on the auxiliary bracket 864. A forwardly disposed end abutment 885 on the rack lift arm 884 carries and, in initial movement, shifts a latch plate 886 out of latching engagement with a latch lug 887 on an arm 888 of the space rack end mounting plate 889. The rack 834 is pivotally mounted by two end plates like plate 889, both of which are fixedly secured on a rack shaft 890. Thus, when latch 886 is unlatched, the abutment 885 on the rack lift arm 884 continues to raise to engage a stud 891 in rack end plate 889, lifting the space rack 834, against the bias of a spring 892, sufficiently to clear the space pawl 833. This action frees the carriage 708 permitting it to be pulled to the left by the clutch 880 and return belt 882.

As the carriage 708 nears the left hand margin, the head of an actuating pin 894 (see FIGURES 22 and 30), fixed on the carriage 708, contacts a plunger 895 mounted in the right hand frame plate 720, moving the plunger to the left. The plunger 895 pushes against the top end of a carriage return hammer lever 896 and rotates the hammer lever counterclockwise until it hits its stop screw 897. Any further movement of hammer lever 896 is then absorbed by pivot bracket 898 and a damper mechanism 899. Carriage operated rotation of the carriage return hammer lever 896 produces two actions. First, it carries and shifts a carriage return latch release pin 900 into actuating abutment with the bent arm 869 of carriage return lever latch 867, unlatching the carriage return latch from clutch lever center arm 871, and allowing the channel shaped carriage return drum actuation lever 872 to return to its normal rest (declutch) position. The other action of hammer lever 896 positively pulls the channel shaped carriage return drum actuating lever 872 into its normal rest position, disengaging the carriage return clutch drum, through the medium of carriage return hammer end link 901. As the carriage return drum actuating lever 896 returns to its normal declutch position, it allows the rack lift arm 884 to drop away from the rack end plate stud 891. Once the carriage return drum actuating lever 872 is back to its normal rest position, it is latched by the carriage return drum actuating lever latch 902 to positively maintain the carriage return clutch drum 876 out of any rebound engagement with its driving clutch element.

To prevent bounce-out of the carriage 708, when returned to the left hand margin, a forked arm, left hand margin latch plate 903 (see FIGURES 22 and 28) is provided, pivotally mounted on top of the carriage 708 and biased clockwise by a spring 904. When the carriage 708 is moved to the left hand position, it is latched by latching of the latch plate 903 with a stud 905 in an abutment plate 906 fixedly secured to the left hand printer frame plate 720. At this stage the space rack 834 is maintained in its up position by a space rack latch 907 (see FIGURES 28 and 30) being latched over the edge of a lug 908 on the carriage backstop 823. After a period of time determined by the printer electronic circuitry, the carriage return solenoid 308 de-energizes and allows its plunger 854 to return to its normal position. This movement unlatches the carriage return drum actuating arm latch 902 and restores all the parts, with the exception of the space rack 834 to their normal rest position.

After the first character is printed and the space cycle starts, the accompanying first operation of the space bail 835 operates a release bellcrank 910, which pushes a link 911 against the margin latch 903, releasing the carriage left hand margin latch and allowing the carriage 708 to start a space movement to the right. As the carriage 708 is spaced for the first character, the space rack latch 907 releases, allowing the space rack 834 to drop to its normal position, in which position the left rack lift plate 888 is latched by the rack lift arm plate 886 engaging the end plate lug 887. This latching prevents raising of the space rack 834, which assures even spacing under normal operation, until the next carriage return operation.

Turning now to FIGURES 31–34, the details of the carriage return drum and clutch assembly 880 are shown. The assembly is mounted on a stud 920 rigidly secured by units 921 and 922 to the left hand printer frame plate 720. The driven clutch member 877 has a sleeve hub 923 axially fixed on stud 920 by clip rings and rotatable on bushings 924. The clutch drive gear 775 is fixed to the disc friction clutch input member 925 which is rotatably mounted on the sleeve 923. The friction clutch discs are alternately fixed to ears on the friction clutch input 925 and to a flat 926 on sleeve 923. Sleeve 923 has a left hand flange 927 with axially projecting positive input clutch teeth 928 facing similar output clutch teeth 929 fixed on a flanged, axially slidable operating sleeve 930.

The drum pulley 876 is coaxially disposed on and riveted to the flanged operating sleeve 930 and is thus rigid with the positive clutch output member. The end 931 of clutch output sleeve 930 is spool shaped to permit connection to the clutch actuating lever which in operation slides the positive clutch output sleeve 930 into and away from positive clutching engagement with input clutch teeth 928.

A continuous back bias is provided on the return belt pulley 876 to keep slack out of the return belt 882. This is accomplished by an auxiliary coil spring 934 in a spring drum cover 935, one end of the coil spring 934 being connected to the output sleeve 930 by a clamp 936 (see FIGURE 34) and the other end passing rearwardly out of the drum cover (see FIGURE 28) and being anchored to the printer frame.

A flywheel disc 940 is rotatably mounted on the positive clutch output sleeve and frictionally engaged to the drum pulley by a light coil spring 942 to damp out any tendency for the drum pulley to undergo a rotational rebound when unclutched. The flywheel 940 tends to keep rotating a short period and applies a friction force against the drum 876 to keep the return belt 882 taut until rebound tendencies are taken over by the light auxiliary carriage return belt coil spring 934.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electronic, transistorized, continuously rotated print drum page printer comprising:

(a) print hammer carriage means;

(b) means to step space said carriage means in multiple steps from a start-of-line position to end-of-line position in front of the rotating print drum; and (c) printer control means including transistorized electronic circuitry providing coincidence between a multiple bit code signal received by said printer and impulse position signals derived from drum rotational positions, for causing the print hammer carriage means to accomplish a printing action against said drum once within a revolution of the drum for each received code signal representing a character to be printed and to thereafter enable and accomplish character spacing.

2. A drum printer as defined in claim 1 wherein said print hammer carriage means comprises: a carriage base, a hammer unit mounted on said carriage base, an electromagnet mounted on said carriage base and an electromagnet armature operator lever unit mounted on said carriage base; said electro-magnet being connected to and controlled by said printer control means and adapted when energized thereby to attract and shift said armature operator lever unit against said hammer unit to transfer an operating force to said hammer unit and thereby accomplish said printing action.

3. A drum printer as defined in claim 1 wherein said printer has a support structure and said means to step space said carriage means comprises a pawl means and a rack in combination providing a stepping control mechanism with an operative structural cooperation between said carriage means and said support structure and connected in control relationship to said printer control means.

4. A drum printer as defined in claim 1, wherein (a) said print hammer carriage means comprises an escapement spacing pawl mechanism and (b) said printer control means includes:

(1) a spacing rack with ratchet teeth mounted parallel to the drum axis adjacent the path of movement of said print hammer carriage, the teeth of said rack cooperating with said escapement pawl mechanism;

(2) a solenoid operated spacing bail in control engagement with said escapement pawl mechanism during its path of movement from adjacent the start-of-line position to the end-of-line position across the face of said drum for controlling escapement action of said pawl mechanism; and (3) means to energize said solenoid in response to an electronic signal derived from said electronic circuitry during a printing action.

5. A drum printer as defined in claim 4, wherein:

(a) means mount said toothed escapement rack for pivotal rocking movement completely away from engagement with said escapement pawl mechanism, (b) means normally latch said rack in a position to be engaged by said pawl mechanism, and (c) carriage return mechanism is connected to said print hammer carriage and comprises means for sequentially unlatching said rack and then rocking said toothed rack away from said escapement pawl mechanism during carriage return movement.

6. A drum printer as defined in claim 1, wherein said printer control means includes means to space said print hammer carriage means one physical step across the page each time it enables and accomplishes character spacing, 7. A drum printer as defined in claim 1, wherein: said print hammer mechanism comprises a spacing pawl mechanism; said printer control means includes a spacing rack with ratchet teeth mounted parallel to the drum axis adjacent the path of movement of said print hammer carriage, the teeth of said rack cooperating with said spacing pawl mechanism, a solenoid operated spacing bail in control engagement with said spacing pawl mechanism during its path of movement from adjacent the start-of-line position to the end-of-line position across the face of said drum for controlling ratchet engagement by said pawl mechanism, and means to energize said solenoid in response to an electronic signal derived from said electronic circuitry at predetermined times during printing action; and wherein means are provided to enable relative movement between said spacing pawl mechanism and said toothed escapement rack to accomplish complete disengagement between said pawl mechanism and said escapement rack; and carriage return means for actuating and maintaining operation of said means enabling relative movement between said toothed rack and said pawl mechanism during carriage return movement.

8. A drum printer as defined in claim 7, wherein said carriage return mechanism includes means rendered operative responsive to an electronic control signal from said electronic circuitry initiated upon receipt of a received carriage return code signal or upon receipt of an automatic printer generated signal indicating that said print hammer carriage means has spaced to the end-of-line position.

9. A drum printer as defined in claim 8, wherein:

(a) said electronic circuitry includes an electronic gating means to provide a line feed signal each time an automatic printer generated carriage return signal is fed to said electronic circuitry; and (b) means are included to engage and line feed the page responsive to any line feed signal from said electronic circuitry.

10. A page printer, with printing means including a carriage means which moves in space steps across a page, comprising:

(a) means for step spacing said carriage means under spring power from a start-of-line position to an end-of-line position;

(b) a positive drive carriage return mechanism including:

(1) a solenoid means for operating positive drive actuation; and (2) return linkage means operable upon energization of said solenoid means, to automatically sequentially accomplish a shift, and latching in a release position, of the means for step spacing said carriage means, starting return movement of said carriage means to a start-of-line position, pre-stressing a step spacing spring for the next set of step spacing actions, latching said carriage means in its start-of-line position exclusive of said step spacing means operation, releasing positive carriage return drive and setting said carriage return mechanism in cocked position for the next carriage return operation;

(c) means responsive to the next received space operation signal for releasing the latched step spacing means mechanism, for releasing the latched carriage means at start-of-line to accomplish the first space step of said carriage means, and to thereafter place said carriage means under control of said step spacing means; and (d) means to energize said solenoid means upon receipt of a signal calling for carriage return.

11. A page printer as defined in claim 10, including a continuously rotating printer drive motor, wherein: said positive drive carriage return mechanism includes a combination friction input and positive drive output clutch with the input connecting to said printer drive motor, a carriage return drum, and a return belt mechanism including a belt connected to said drum and rigged to pull said carriage means back to a start-of-line position upon solenoid operated engagement of said positive drive portion of said combination clutch.

12. A page printer as defined in claim 11, comprising:

(a) a return drum pre-biasing means for keeping said return belt mechanism in a taut belt condition, and (b) a return drum rebound damping device frictionally coupled to said carriage return drum.

13. A page printer as defined in claim 10, wherein a start-of-line carriage stop mechanism is provided and said carriage stop mechanism includes a bounce-out damping device preventing rebound of said carriage means upon its reaching the start-of-line position.

14. In a multiple bit code receiving page printer having a shiftable print hammer carriage and spacing means accomplishing character spacing including step movements of said carriage from start-of-line to end-of-line position and a carriage return mechanism for returning said carriage to a start-of-line position, an electronic control means comprising:

(a) a print inhibiting transistorized circuit responsive to a signal indicative of carriage return operation for inhibiting print operations during the entire period of the carriage return to start-of-line position, and (b) code signal storage means continuously operative to prevent loss of any code signal received into the electronic control means during carriage return movement.

15. A page printer as defined in claim 14, wherein:

(a) said storage means includes at least three storage register groups and said carriage return movement is accomplished within the time period necessitated by the line rate of transmission for transmitting three character code signals;

(b) said electronic control means accomplishing the storing of each received code signal in parallel bit form in the first of said registered groups and thereafter successively gating said stored code signal bits into the second and then into the third register groups, and including (1) electronic gating means responsive to a read-out signal generated within said printer to cause printing of a stored character code signal in the third register group; and (c) said means which inhibit printing during carriage return, preventing such read-out from said third register which in turn automatically blocks gating from the second register to the third register and from the first register to the second register for a time period sufficient to enable the carriage to return to its start-of-line position.

16. An electronic transistorized drum printer having a carriage with print hammer means including a hammer and automatic print hammer carriage return with electronic control circuitry capable of receiving multiple serial information bits on an incoming line, comprising:

(a) means responsive to print drum rotation to develop electrical position pulses as each print drum character passes a predetermined position, (b) means including a first register to be connected to said incoming line to convert and register received code signal units in parallel bit form, (c) means to determine whether such registered code unit bits call for printing of a character or for a machine function and determining, if a machine function is called for, what that machine function is, (d) a second register connected to receive said multiple bit parallel information from said first register to make room for receiving the next following character on the incoming line while the first character is being printed or while the represented function is being performed, (e) a third register connected to said second register and means to shift the multiple code unit bits from said second register into the third register to provide storage for two additional characters during an automatic carriage return, and (f) means connected to said print hammer means, said third register and said carriage providing coincidence control responsive to the code unit bits in said third register and to position pulses derived from print drum rotation to determine when the character corresponding to the registered code signal is about to pass the print hammer, thereafter controlling printing action, clearing said third register, controlling subsequent operation of character spacing after the character is printed and enabling automatic control for operation of carriage return and line feed.

17. A continuously rotatable print drum page record printer having an ink ribbon feed and reverse device rigged with a front stretch of ink ribbon passing completely across the cylindrical surface of said drum parallel to the drum axis, and including:

(a) a ribbon lift means operable during a predetermined time period preceding printing for lifting said front stretch of ribbon, as a parallel unit at least as long as the length of a line of print symbols across the surface of said drum, to a position in front of the print hammer and across the page record, and operable to lower said stretch of ribbon immediately after printing.

18. A rotatary print device page record printer comprising:

(a) a rotatably mounted print device on an axis parallel to a line across said page record;

(b) print device end bearing mounting means on each side of said print device;

(c) a record feed wheel rotatably mounted on each end bearing mounting means rotatable relative to said rotatable print device; and (d) feed mechanism cooperating with both of said feed wheels to provide line feed of the page record.

19. A page printer as defined in claim 18, wherein:

(a) each of said feed wheels has an annular groove cut around its periphery, and (b) an approximately one-half O-ring band is tightly disposed in said annular groove with an annular portion projecting radially slightly above the peripheral surface of said feed wheel to provide a band with a high coefficient of friction for gripping and line feeding a page record.

20. A page printer as defined in claim 18, wherein:

each of said end bearing mounting means includes an end bearing retainer means;

an axle means is provided and said print device is non-rotatably secured to said axle means;

an end bearing assembly for rotatably journalling said axle means is disposed over each end of said axle means and mounted in an associated end bearing retainer means;

each of said record feed wheels includes a ring gear non-rotatably secured thereto and, in assembly, being axially fixed and rotatably journalled on an associated one of said end bearing retainer means;

an axle means drive gear secured to one end of said axle means;

means rigidly secure each end bearing retainer means in printer frame structure; and drive means are connected to said drive gear for rotating said print device.

21. A page printer as defined in claim 20, wherein:

(a) the other end of said axle means projects through its associated end bearing retainer means;

(b) a clock head mounting plate is fixed on said bearing retainer means adjacent said other end of the axle means;

(c) a print device position clock wheel is secured to said other end of the axle means adjacent said clock head mounting plate;

(d) and clock monitor head means are secured on said mounting plate in position adjacent said clock wheel enabling such heads to be inductively pulsed by conjoint rotation of said print device and said clock wheel to provide electronic coincidence signals indicative of the print character angular positions during an angle of rotation of said print device.

22. A page printer as defined in claim 21, further comprising:

electronic circuitry means responsive to induction pulses from said clock head monitor means to:

(1) determine which of several angular sectors of the print device is at any time rotating its characters past a print station, (2) simultaneously search a code signal register for any registered received code signals corresponding to a pulsed identification of a character which will appear in the identified sector of rotation of said print device, and (3) thereafter cause printing of that character as it rotates past the print station.

23. A page printer as defined in claim 18, wherein:

(a) said print device is a rotatably mounted print drum; and (b) said end bearing mounting means is at each end of said print drum.

24. A drum page printer as defined in claim 23, wherein:

each of said end bearing mounting means includes an end bearing retainer means;

each of said page record feed wheels includes a ring gear non-rotatably secured thereto and, in assembly, axially fixed and rotatably journalled on an associated one of said end bearing retainer means assemblies adjacent the ends of said print drum;

an axle shaft means is provided for said drum and projects through said bearing retainer means; a drum drive gear is secured to one end of said drum axle shaft means;

means rigidly secure each end bearing retainer means in printer frame structure; and drive means are connected to said drum gear for rotating said type drum.

25. For use in a traveling print carriage a print hammer block adapted to be clamped to said carriage, a small print hammer mounted for limited travel in said block and having a portion with an operator impact end projecting, in a hammer rest position, from said block, an operator abutment on said block adjacent said projected hammer impact end projecting from the main block portion a distance slightly less than the said projection of said print hammer, to enable abutment blocking of a hammer operator subsequent to its impacting the hammer so the primary hammer print action is due to a high velocity inertia force in the free moving print hammer resulting solely from armature impact.

26. An electronic, transistorized, continuously rotated print drum, code data receiving page printer comprising: a rotatable print drum; print hammer carriage means comprising: a traveling print carriage, a print hammer operator means, a print hammer block adapted to be clamped to said carriage, a small print hammer mounted for limited travel in said block and having a portion with an operator impact end projecting, when in a hammer rest position, from said block, an operator abutment on said block adjacent said projected hammer impact end projecting from the main block portion a distance slightly less than the said projection of said print hammer, to enable abutment blocking of said hammer operator means subsequent to its impacting the hammer so the primary hammer print action is due to a high velocity inertia force in the free moving print hammer resulting solely from armature impact; means to step space said carriage means from a start-of-line position to end-of-line position in front of the rotating print drum; and printer control means including transistorized electronic circuitry providing coincidence between a multiple bit code signal received by said printer and impulse position signals derived from drum rotational positions, for causing the print hammer carriage operator means to operate said print hammer and accomplish a printing action against said drum, during rotation of the drum, for each received code signal representing a character to be printed and to thereafter enable and accomplish character spacing.

References Cited by the Examiner

UNITED STATES PATENTS

| | | | |
|---|---|---|---|
| 2,484,198 | 10/1949 | Veltman et al. | 197—86 |
| 2,505,729 | 4/1950 | Zenner | 178—25 |
| 2,724,479 | 11/1955 | Durkee | 197—68 |
| 3,049,990 | 8/1962 | Brown et al. | 101—93 |
| 3,120,801 | 2/1964 | Davies et al. | 101—93 |
| 3,135,195 | 6/1964 | Potter | 101—93 |

NEIL C. READ, *Primary Examiner.*

T. A. ROBINSON, *Assistant Examiner.*